US008206770B2

(12) United States Patent
Aldred et al.

(10) Patent No.: US 8,206,770 B2
(45) Date of Patent: Jun. 26, 2012

(54) FROZEN PRODUCTS

(75) Inventors: Deborah Lynne Aldred, Shambrook (GB); Mark John Berry, Shambrook (GB); Deryck Jozef Cebula, Shambrook (GB); Andrew Richard Cox, Shambrook (GB); Matthew Duncan Golding, Vlaardingen (NL); Sarah Golding, Vlaardingen (NL); Robert Daniel Keenan, Shambrook (GB); Mark Emmett Malone, Palmerston North (NZ); Sarah Twigg, Shambrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 11/168,214

(22) Filed: Jun. 27, 2005

(65) Prior Publication Data

US 2006/0024419 A1 Feb. 2, 2006

(30) Foreign Application Priority Data

Jul. 27, 2004 (EP) .................................... 04254483
Mar. 3, 2005 (EP) .................................... 05251282

(51) Int. Cl.
*A23G 9/38* (2006.01)

(52) U.S. Cl. ........................ 426/565; 426/656; 426/660

(58) Field of Classification Search .................. 426/565, 426/103, 330.4, 564, 660, 656, 658, 589, 426/574
See application file for complete search history.

(56) References Cited

U.S. PATENT DOCUMENTS

| | | | | |
|---|---|---|---|---|
| 4,627,983 | A | 12/1986 | Scharf et al. | |
| 4,874,627 | A * | 10/1989 | Greig et al. | 426/565 |
| 5,084,295 | A * | 1/1992 | Whelan et al. | 426/565 |
| 5,215,777 | A | 6/1993 | Asher et al. | |
| 6,096,867 | A | 8/2000 | Byass et al. | |
| 2001/0048962 | A1 * | 12/2001 | Anthony Fenn et al. | 426/565 |
| 2003/0148400 | A1 | 8/2003 | Haikara et al. | |

FOREIGN PATENT DOCUMENTS

| | | |
|---|---|---|
| CA | 1094866 | 2/1981 |
| DE | 297 15 519 | 11/1997 |
| EP | 0426211 | 11/1993 |
| EP | 1 327 390 | 7/2003 |
| GB | 1556297 | 11/1979 |
| JP | S52-102444 | 8/1977 |
| JP | H03-164156 | 7/1991 |
| JP | H03-244348 | 10/1991 |
| WO | WO 91/11109 | 8/1991 |
| WO | WO 96/41882 | * 12/1996 |
| WO | 99/54725 | 10/1999 |
| WO | 00/58342 | 10/2000 |
| WO | WO 01/14521 | 3/2001 |
| WO | 01/57076 | 8/2001 |
| WO | 01/74864 | 10/2001 |

(Continued)

OTHER PUBLICATIONS

Arbuckle, Ice Cream 2nd Edition, The AVI Publishing Group 1972, pp. 241 and 245-250.*

(Continued)

*Primary Examiner* — Kelly Bekker
(74) *Attorney, Agent, or Firm* — Morgan, Lewis & Bockius LLP

(57) ABSTRACT

A frozen composition is provided which includes hydrophobin. Also provided is the use of hydrophobin in inhibiting ice crystal growth and/or modifying ice crystal habit in frozen food products.

13 Claims, 4 Drawing Sheets

FOREIGN PATENT DOCUMENTS

| | | |
|---|---|---|
| WO | 03/015530 | 2/2003 |
| WO | 03/053383 | 7/2003 |

OTHER PUBLICATIONS

Fennema's Food Chemistry 4th Edition CRC Press 2008 pp. 727 and 728.*
Dictionary.com, Stabilizer, pp. 1-5. print date Jun. 14, 2010.*
Guargum.biz, Guar Gum, pp. 1-2. print date Jun. 14, 2010.*
Haakanpaa et al., "Atomic Resolution Structure of the HFBII Hydrophobin, a Self-assembling Amphiphile", The Journal of Biological Chemistry, 2004, The American Society for Biochemistry and Molecular Biology, Inc., vol. 279, No. 1, Issue of Jan. 2, pp. 534-539.
Lindner et al., hydrophobins: the protein-amphiphiles of filamentous fungi, 2005, Elsevier B.V. on behalf of the Federation of European Microbiological Societies, pp. 1-20.
Penttila et al., Molecular Biology of *Trichoderma* and Biotechnological Applications, "Handbook of Fungal Biotechnology" 2nd edition, edited by Dilip et al., vol. 20, pp. 413-472, 2004.
Woesten, "Hydrophobins, the fungal coat unravelled", Biochimica et Biophysica Seta. MR. Reviews on Biomembranes, Elsevier, Amsterdam, NL, vol. 1469, No. 2, Sep. 18, 2000,pp. 79-86.
Wessells J, "Fungal hydrophobins: proteins that function at an interface", Trends in Plant Science, Elsevier Science, Oxford GB, vol. 1, Jan. 1996, pp. 9-15.
International Search Report on Application No. PCT/EP2005/006997 dated Dec. 13, 2005, pp. 1-4.
International Search Report on Application No. PCT/EP2005/006996 dated Oct. 18, 2005, pp. 1-5.
European Search Report on Application No. EP 04 25 4483 dated Jan. 17, 2005, pp. 1-2.
European Search Report on Application No. EP 05 07 6480 dated Oct. 3, 2005, pp. 1-4.
European Search Report on Application No. EP 05 07 6481 dated Oct. 3, 2005, pp. 1-4.
Database WPI, Section Ch, Week 200444, XP002313777 & KR 2004 018 844 A, p. 1, 2004.
Scholmeijer et al., "Fungal Hydrophobins in Medical and Technical Applications", Applied Microbiology and Biotechnology, Springer Verlag, Berlin, DE, vol. 56, No. ½, pp. 1-8, May 2001.
Wessels, "Hydrophobins: Proteins that Change the Nature of the Fungal Surface", 1997, Adv. Microb. Physio 38: pp. 1-45.
Wosten, "Hydrophobins: Multipurpose Proteins", 2001, Annu Rev. Microbiol. 55: pp. 625-646.
de Vocht et al., "Structural Characterization of the Hydrophobin SC3, as a Monomer and after Self-Assembly at Hydrophobic/Hydrophilic Interfaces", Biophys. J. 74: pp. 2059-2068, Apr. 1998.
Collin et al., "A novel two-step extraction method with detergent/polymer systems for primary recovery of the fusion protein endoglucanase I-hydrophobin I", 2002, Biochim Biophys Acta. 1569: pp. 139-150.
Calonje et al., Properties of a hydrophobin isolated from the mycoparasitic fungus *Verticillium fungicola*, Can. J. Microbiol. 48: pp. 1030-1034, Dec. 2002.
Askolin et al., "Overproduction, purification, and characterization of the *Trichoderma reesei* hydrophobin HFBI", 2001, Appl. Microbiol Biotechnol. 57: pp. 124-130.
De Vries et al., Identification and characterization of a tri-partite hydrophobin from *Claviceps fusiformis*, 1999, Eur J. Biochem. 262: pp. 377-385.
Kershaw et al., "Hydrophobins and Repellents: Proteins with Fundamental Roles in Fungal Morphogenesis", 1998, Fungal Genetics and Biology 23: pp. 18-33.
Van der Werf, 2000 Leads in Life Sciences Jul. 2000: 5, pp. 1-2.
Talbot, 2001 fungal Hydrophobins in "The Mycota: A Comprehensive Treatise on Fungi as Experimental Systems for Basic and Applied Research" Howard and Gow (Eds), vol. 7: "Biology of the Fungal Cell" Springer-Verlag, Berline and Heidelberg GmbH and Co., pp. 145-159.
Co-pending application for Berry et al., Case No. F3360(C); U.S. Appl. No. 11/168,209, filed Jun. 27, 2005, pp. 1-36.
Gilga, article available on Internet at least as of May 29, 2007 regarding hydrophobins (original plus English language translation), pp. 1-21 (original document and translation).
Stringer et al., "Cerato-ulmin, a Toxin involved in Dutch Elm Disease, is a Fungal Hydrophobin", The Plant Cell, Feb. 1993, pp. 145-146.
Russo et al., "The surface activity of the phytotoxin cerato-ulmin", 1982, National Research Council of Canada pp. 1414-1422.

* cited by examiner

A

B

A

B

FROZEN PRODUCTS

FIELD OF THE INVENTION

The present invention relates to frozen products that include hydrophobins.

BACKGROUND TO THE INVENTION

During storage, the ice crystals present in frozen products tend to increase in size as a result of dynamic processes such as recrystallisation. This can lead to poor product characteristics such as poor appearance and unacceptable mouthfeel and/or to product damage. It has been suggested previously to use proteins termed "anti-freeze proteins" (also known as "ice structuring proteins") to inhibit the process of ice recrystallisation.

SUMMARY OF THE INVENTION

We have found that a class of proteins found in fungi, termed hydrophobins, are also able to inhibit ice crystal growth in frozen products.

Accordingly, the present invention provides a frozen composition, such as a frozen food product, comprising hydrophobin, preferably hydrophobin in isolated form. In a related aspect, the present invention provides a frozen composition, such as a frozen food product, comprising hydrophobin in a form capable of assembly at an air-liquid surface and a frozen composition, such as a frozen food product, to which hydrophobin in said form has been added.

Preferably the hydrophobin is a class II hydrophobin.

In a preferred embodiment, hydrophobin is present in an amount of at least 0.001 wt %, more preferably at least 0.01 wt %.

In one embodiment, the frozen composition is aerated. In another embodiment, the frozen composition is unaerated.

In a related aspect, the present invention provides a composition for producing a frozen food product of the invention, which composition comprises hydrophobin, preferably hydrophobin in isolated form, together with at least one of the remaining ingredients of the food product, the composition being in unfrozen form. Preferably the composition comprises all the remaining ingredients of the food product.

In a related embodiment, the present invention provides a dry composition for producing a frozen food product of the invention, which composition comprises hydrophobin, preferably hydrophobin in isolated form, together with at least one of the remaining non-liquid ingredients of the food product. Preferably the composition comprises all the remaining non-liquid ingredients of the food product.

The present invention also provides the use of hydrophobin in a method of inhibiting ice crystal growth in a frozen composition. Preferably the hydrophobin is used to inhibit ice recrystallisation.

In a related aspect, the present invention also provides the use of hydrophobin in a method of modifying ice crystal habit in a frozen composition.

The present invention further provides a method of inhibiting ice crystal growth, for example ice recrystallisation, in a frozen composition which method comprises adding to the composition hydrophobin prior to and/or during freezing of the composition.

In a related aspect, the present invention provides a method of modifying ice crystal habit in a frozen composition which method comprises adding to the composition hydrophobin prior to and/or during freezing of the product.

In a preferred embodiment of the above-described uses and methods, the composition is a frozen food product.

DETAILED DESCRIPTION OF THE INVENTION

Unless defined otherwise, all technical and scientific terms used herein have the same meaning as commonly understood by one of ordinary skill in the art (e.g. in chilled confectionery/frozen confectionery manufacture, chemistry and biotechnology). Definitions and descriptions of various terms and techniques used in chilled/frozen confectionery manufacture are found in Ice Cream, 4$^{th}$ Edition, Arbuckle (1986), Van Nostrand Reinhold Company, New York, N.Y. Standard techniques used for molecular and biochemical methods can be found in Sambrook et al., Molecular Cloning: A Laboratory Manual, 3$^{rd}$ ed. (2001) Cold Spring Harbor Laboratory Press, Cold Spring Harbor, N.Y. and Ausubel et al., Short Protocols in Molecular Biology (1999) 4$^{th}$ Ed, John Wiley & Sons, Inc.—and the full version entitled Current Protocols in Molecular Biology).

Hydrophobins

Hydrophobins are a well-defined class of proteins (Wessels, 1997, Adv. Microb. Physio. 38: 1-45; Wosten, 2001, Annu Rev. Microbiol. 55: 625-646) capable of self-assembly at a hydrophobic/hydrophilic interface, and having a conserved sequence:

(SEQ ID No. 1)

$X_n$-C-$X_{5-9}$-C-C-$X_{11-39}$-C-$X_{8-23}$-C-$X_{5-9}$-C-C-$X_{6-18}$-C-$X_M$ where X represents any amino acid, and n and m independently represent an integer. Typically, a hydrophobin has a length of up to 125 amino acids. The cysteine residues (C) in the conserved sequence are part of disulphide bridges. In the context of the present invention, the term hydrophobin has a wider meaning to include functionally equivalent proteins still displaying the characteristic of self-assembly at a hydrophobic-hydrophilic interface resulting in a protein film, such as proteins comprising the sequence:

(SEQ ID No. 2)

$X_n$-C-$X_{1-50}$-C-$X_{0-5}$-C-$X_{1-100}$-C-$X_{1-100}$-$X_{1-50}$-C-$X_{0-5}$-C-$X_{1-50}$-C-$X_M$ or parts thereof still displaying the characteristic of self-assembly at a hydrophobic-hydrophilic interface resulting in a protein film. In accordance with the definition of the present invention, self-assembly can be detected by adsorbing the protein to Teflon and using Circular Dichroism to establish the presence of a secondary structure (in general, α-helix) (De Vocht et al., 1998, Biophys. J. 74: 2059-68).

The formation of a film can be established by incubating a Teflon sheet in the protein solution followed by at least three washes with water or buffer (Wosten et al., 1994, Embo. J. 13: 5848-54). The protein film can be visualised by any suitable method, such as labeling with a fluorescent marker or by the use of fluorescent antibodies, as is well established in the art. m and n typically have values ranging from 0 to 2000, but more usually m and n in total are less than 100 or 200. The definition of hydrophobin in the context of the present invention includes fusion proteins of a hydrophobin and another polypeptide as well as conjugates of hydrophobin and other molecules such as polysaccharides.

Hydrophobins identified to date are generally classed as either class I or class II. Both types have been identified in fungi as secreted proteins that self-assemble at hydrophobilic interfaces into amphipathic films. Assemblages of class I hydrophobins are relatively insoluble whereas those of class II hydrophobins readily dissolve in a variety of solvents.

Hydrophobin-like proteins have also been identified in filamentous bacteria, such as *Actinomycete* and *Steptomyces* sp. (WO01/74864). These bacterial proteins, by contrast to fungal hydrophobins, form only up to one disulphide bridge since they have only two cysteine residues. Such proteins are an example of functional equivalents to hydrophobins having the consensus sequences shown in SEQ ID Nos. 1 and 2, and are within the scope of the present invention.

The hydrophobins can be obtained by extraction from native sources, such as filamentous fungi, by any suitable process. For example, hydrophobins can be obtained by culturing filamentous fungi that secrete the hydrophobin into the growth medium or by extraction from fungal mycelia with 60% ethanol. It is particularly preferred to isolate hydrophobins from host organisms that naturally secrete hydrophobins. Preferred hosts are hyphomycetes (e.g. Trichoderma), basidiomycetes and ascomycetes. Particularly preferred hosts are food grade organisms, such as *Cryphonectria parasitica* which secretes a hydrophobin termed cryparin (MacCabe and Van Alfen, 1999, App. Environ. Microbiol 65: 5431-5435).

Alternatively, hydrophobins can be obtained by the use of recombinant technology. For example host cells, typically micro-organisms, may be modified to express hydrophobins and the hydrophobins can then be isolated and used in accordance with the present invention. Techniques for introducing nucleic acid constructs encoding hydrophobins into host cells are well known in the art. More than 34 genes coding for hydrophobins have been cloned, from over 16 fungal species (see for example WO96/41882 which gives the sequence of hydrophobins identified in *Agaricus bisporus*; and Wosten, 2001, Annu Rev. Microbiol. 55: 625-646). Recombinant technology can also be used to modify hydrophobin sequences or synthesise novel hydrophobins having desired/improved properties.

Typically, an appropriate host cell or organism is transformed by a nucleic acid construct that encodes the desired hydrophobin. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species, include yeasts such as (but not limited to) those of the genera *Saccharomyces, Kluyveromyces, Pichia, Hansenula, Candida, Schizo saccharomyces* and the like, and filamentous species such as (but not limited to) those of the genera *Aspergillus, Trichoderma, Mucor, Neurospora, Fusarium* and the like.

The sequences encoding the hydrophobins are preferably at least 80% identical at the amino acid level to a hydrophobin identified in nature, more preferably at least 95% or 100% identical. However, persons skilled in the art may make conservative substitutions or other amino acid changes that do not reduce the biological activity of the hydrophobin. For the purpose of the invention these hydrophobins possessing this high level of identity to a hydrophobin that naturally occurs are also embraced within the term "hydrophobins".

Hydrophobins can be purified from culture media or cellular extracts by, for example, the procedure described in WO 01/57076 which involves adsorbing the hydrophobin present in a hydrophobin-containing solution to surface and then contacting the surface with a surfactant, such as Tween 20, to elute the hydrophobin from the surface. See also Collen et al., 2002, Biochim Biophys Acta. 1569: 139-50; Calonje et al., 2002, Can. J. Microbiol. 48: 1030-4; Askolin et al., 2001, Appl Microbiol Biotechnol. 57: 124-30; and De Vries et al., 1999, Eur J Biochem. 262: 377-85.

Frozen Compositions

Frozen compositions/frozen products include frozen food products and frozen biological materials. Frozen food products include frozen plant-derived materials, such as fruit and vegetables, frozen animal-derived materials, such as frozen meat and fish, as well as frozen processed food products, such as ready-made meals, sauces and frozen confections such as ice cream, milk ice, frozen yoghurt, sherbet, slushes, frozen custard, water ice, sorbet, granitas and frozen purees.

Frozen compositions of the invention can be aerated or unaerated. The term "aerated" means that gas has been intentionally incorporated into the product, such as by mechanical means. The gas is preferably any food-grade gas such as air, nitrogen or carbon dioxide. The extent of aeration, especially in the context of aerated food products, is typically defined in terms of "overrun". In the context of the present invention, % overrun is defined in volume terms as:

$$((\text{volume of the final aerated product} - \text{volume of the mix})/\text{volume of the mix}) \times 100$$

The amount of overrun present in the product will vary depending on the desired product characteristics. For example, the level of overrun in ice cream is typically from about 70 to 100%, whereas the overrun in water ices is from 25 to 30%.

An unaerated composition, such as a frozen food product, preferably has an overrun of less then 20%, more preferably less than 10%. An unaerated frozen food product is not subjected to deliberate steps such as whipping to increase the gas content. Nonetheless, it will be appreciated that during the preparation of unaerated frozen food products, low levels of gas, such as air, may be incorporated in the product.

Frozen Confectionery Products

Frozen confections include confections that typically include milk or milk solids, such as ice cream, milk ice, frozen yoghurt, sherbet and frozen custard, as well as frozen confections that do not contain milk or milk solids, such as water ice, sorbet, granitas and frozen purees.

The frozen confections may be in the form of a composite product where at least one portion or region of the product, such as a core or layer, does not contain hydrophobin. An example of this would be a product containing a core of ice cream which lacks hydrophobin, coated in a layer of ice cream, milk ice or water ice that does contain hydrophobin. It will be appreciated that in the case of a composite product, the wt % amount of hydrophobin added is calculated solely in relation to those components of the confection that contain hydrophobin and not in relation to the complete product.

Aerated frozen confections preferably have an overrun of from 25% to 300%, such as from 25% to 150%, more preferably from 50 to 150%.

The amount of hydrophobin present in the frozen compositions of the invention will generally vary depending on the product formulation and, in the case of aerated products, the volume of the air phase. Typically, the product will contain at least 0.001 wt %, hydrophobin, more preferably at least 0.005 or 0.01 wt %. Typically the product will contain less than 1 wt % hydrophobin. The hydrophobin may be from a single source or a plurality of sources e.g. the hydrophobin can a mixture of two or more different hydrophobin polypeptides.

Preferably the hydrophobin is class II hydrophobin.

The present invention also encompasses compositions for producing a frozen food product of the invention, which composition comprises hydrophobin. Generally, the hydrophobin will be in isolated form, typically at least partially purified, such as at least 10% or 20% pure, based on weight of solids. Thus, the hydrophobin is not added as part of a naturally-occurring organism, such as a mushroom, which naturally expresses hydrophobins. Instead, the hydrophobin will typically either have been extracted from a naturally-occurring source or obtained by recombinant expression in a host organism.

Such compositions include liquid premixes, for example premixes used in the production of frozen confectionery products, and dry mixes, for example powders, to which an aqueous liquid, such as milk or water, is added prior to or during freezing.

The compositions for producing a frozen food product of the invention, will comprise other ingredients, in addition to the hydrophobin, which are normally included in the food product, e.g. sugar, fat, emulsifiers, flavourings etc. The compositions may include all of the remaining ingredients required to make the food product such that the composition is ready to be processed to form a frozen food product of the invention.

Dry compositions for producing a frozen food product of the invention will also comprise other ingredients, in addition to the hydrophobin, which are normally included in the food product, e.g. sugar, fat, emulsifiers, flavourings etc. The compositions may include all of the remaining non-liquid ingredients required to make the food product such that all that the user need only add an aqueous liquid, such as water or milk, and the composition is ready to be processed to form a frozen food product of the invention. These dry compositions, examples of which include powders and granules, can be designed for both industrial and retail use, and benefit from reduced bulk and longer shelf life.

The hydrophobin is added to a composition in a form and in an amount such that it is available to inhibit ice crystal growth, such as ice recrystallisation, and/or modify ice crystal habit. By the term “added”, we mean that the hydrophobin is deliberately introduced into the composition for the purpose of taking advantage of its ability to inhibit ice crystal growth and/or modify ice crystal habit. Consequently, where ingredients are present or added that contain fungal contaminants, which may contain hydrophobin polypeptides, this does not constitute adding hydrophobin within the context of the present invention.

Typically, the hydrophobin is added to the product in a form that is capable of self-assembly at an air-liquid surface.

Typically, the hydrophobin is added to the compositions of the invention in an isolated form, typically at least partially purified, such as at least 10% pure, based on weight of solids. By “added in isolated form”, we mean that the hydrophobin is not added as part of a naturally-occurring organism, such as a mushroom, which naturally expresses hydrophobins. Instead, the hydrophobin will typically either have been extracted from a naturally-occurring source or obtained by recombinant expression in a host organism.

The added hydrophobin can be used to reduce or inhibit the growth of ice crystals, for example to inhibit the process of ice recrystallisation, and/or to modify ice crystal habit (i.e. ice crystal shape). Inhibition and/or modification can take place during freezing and or after freezing e.g. during storage. Inhibition of ice crystal growth and/or ice crystal habit during freezing can be used to alter the texture of the product. Inhibition of ice recrystallisation improves product stability in response to thermal abuse.

Hydrophobins can also be used to inhibit ice crystal growth, such as ice recrystallisation, and/or ice crystal habit in cellular biological materials. This will assist in reducing damage to cells as a result of the freezing processes used to preserve biological materials. Such biological materials include cultures of unicellular organisms and cell lines; gametes e.g. sperm and ova; and tissue and organs derived from multicellular organisms, both plants and animals.

Accordingly the present invention also provides a frozen cellular biological material comprising hydrophobin in isolated form, preferably comprising at least 0.001 wt % hydrophobin, with the proviso that human beings are specifically excluded.

The present invention further provides the use of hydrophobin to inhibit ice crystal growth, such as ice recrystallisation, and/or modify ice crystal habit in a frozen cellular biological material. Inhibition/modification can be during and/or after freezing of the biological material.

The present invention will now be described further with reference to the following examples which are illustrative only and non-limiting.

EXAMPLE 1

Aerated Frozen Products

Figure 1:
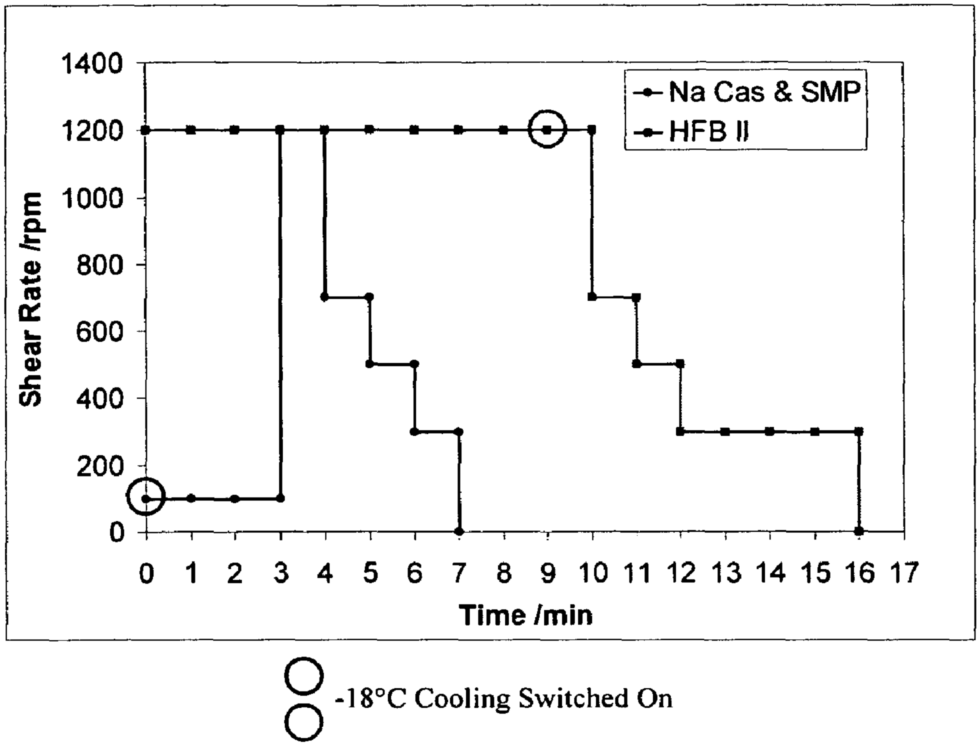
FIG. 1 is a diagram showing shear regimes for the aerated frozen products

Aerated frozen products were prepared using 3 types of protein:

A: Sodium Caseinate (Na Cas)
B: Skimmed Milk Powder (SMP)
C: Hydrophobin (HFBII) from *Trichoderma reesei*

Microstructural and physical properties of the products were compared, both before and after temperature abuse regimes.

Materials

Details of the materials used are summarised in Table 1 and the formulations from which each of the aerated frozen products was prepared are shown in Table 2.

TABLE 1

Materials used

| Ingredient | Composition | Supplier |
|---|---|---|
| Sodium caseinate | 88-90% protein, 1.5% fat, 6% moisture | DMV International, The Netherlands. |

TABLE 1-continued

| Materials used | | |
|---|---|---|
| Ingredient | Composition | Supplier |
| Skimmed milk powder | 33-36% protein, 0.8% fat, 3.7% moisture | United Milk, UK. |
| Hydrophobin type II (HFB II) | Purified from *Trichoderma reesei* essentially as described in WO00/58342 and Linder et al, 2001, Biomacromolecules 2: 511-517). | VTT Biotechnology, Finland. |
| Refined Coconut Oil | | Van den Bergh Foods, Limited |
| Sucrose | | Tate and Lyle, UK. |

TABLE 2

| Formulations used | | | |
|---|---|---|---|
| Ingredient | Mix A | Mix B | Mix C |
| | Concentration/wt % | | |
| Sodium caseinate | 2.0 | — | — |
| Skimmed milk powder | — | 11.42 | — |
| HFB II | — | — | 0.2 |
| Coconut Oil | 5.0 | 5.0 | 5.0 |
| Sucrose | 25.0 | 20.0 | 25.0 |
| Water | 68.0 | 63.58 | 69.8 |

Preparation of the Aerated Frozen Products

Mix (Emulsion) Preparation

All mixes were made in 100 g batches. For Mixes A and B (containing sodium caseinate and skimmed milk powder, respectively), the protein was combined with the sucrose and dispersed into cold water using a magnetic stirrer. The solution was then heated to 60° C. with stirring and held for 5 minutes before being cooled to 40° C. Molten coconut fat was then added and the aqueous mix immediately sonicated (Branson Sonifer with 6.4 mm tapered tip) for 3 minutes at 70% amplitude with the tip well immersed in the solution. The emulsion was then cooled rapidly in a −10° C. water bath until the solution temperature was 5° C., to crystallise the fat droplets. The mixes were stored at 5° C. until further use.

For Mix C (containing HFB II), the sucrose was first dispersed into cold water with stirring. Then, half of the required concentration of HFB II was added to this as an aliquot. The solution was then gently sonicated in a sonic bath for 30 seconds to fully disperse the HFB II. This solution was then stirred on a magnetic stirrer and heated to 40° C. Before the molten fat was added the solution was again sonicated in a sonic bath for 30 seconds. The molten fat was then added and the mix was emulsified and cooled as described for Mixes A and B. A further aliquot of HFB II was then added to this cold solution to bring the HFB II concentration up to 0.2%. The first 0.1% of HFB II was for emulsifying and stabilising the fat. The second addition of HFB II would provide adequate excess HFBII to provide good aeration and foam stability.

Particle size analysis on the chill emulsions was performed using a Malvern Mastersizer 2000.

Analysis of Emulsions

Following this methodology, we were able to make emulsions with small fat droplets. A summary of oil droplet sizes measured is shown in Table 3.

TABLE 3

| Emulsion particle size as measured using the Malvern Mastersizer 2000 | |
|---|---|
| Mix | Fat droplet diameter D(3.2)/μm |
| A (Na Cas) | 0.4 |
| B (SMP) | 0.25 |
| C (HFB II) | 1.88 |

Shear Freezing Process 80 ml of mix was sheared and frozen simultaneously in a cylindrical, vertically mounted, jacketed stainless steel vessel with internal proportions of 105 mm height and diameter 72 mm. The lid of the vessel fills 54% of the internal volume leaving 46% (180 ml) for the sample. The rotor used to shear the sample consists of a rectangular impeller of the correct proportions to scrape the surface edge of the container as it rotates (dimensions 72 mm×41.5 mm). Also attached to the rotor are two semi-circular (60 mm diameter) high-shear blades positioned at a 45° angle to the rectangular attachment. The vessel is surrounded by a jacket through which coolant flows.

In essence an aerated and frozen prototype is produced as follows: The mix inside the enclosed container is mixed with an impeller at a high shear rate in order to incorporate air. Simultaneously, the coolant flows around the container jacket to cool and freeze the mix. The impeller also scrapes the inside wall, removing the ice that forms there and incorporating this into the rest of the mix. High shear is used to initially aerated the mix, and then the shear rate is slowed in order to allow better cooling and freezing. The shear regimes used for each mix are graphically presented in FIG. 1.

For the freezing and aeration step with Mixes A and B (containing sodium caseinate and skimmed milk powder, respectively) the coolant (set at −18° C.) was set to circulate from Time=0 minutes. The relatively slow stirring at the start for Mixes A and B allowed for cooling of the mix and generation of some viscosity (via ice formation and incorporation) prior to aeration using higher shear. A short time at high speed incorporated the air and then the speed was stepped down to allow the samples to reach at least −5° C.

For Mix C (containing HFB II) the pot was chilled to about 5° C. and the sample added and the high shear for aerated started. The coolant (set at −18° C.) was not switched to circulate on until 9 minutes due to the increased time required to generate 100% overrun. Once the coolant was switched on to circulate (at 9 minutes), the same shear-cooling pattern as previous (for A and B) was adopted.

At the end of the process, overrun was measured and samples (approximately 15 g) were placed into small pots. Each product was cooled further for 10 minutes in a freezer set at −80° C. before being stored at −20° C.

Analysis of Aerated Frozen Products

All aerated frozen products were stored under two temperature regimes:

(a) −20° C. Subsequent analysis was made within one week of production and we deem this as "fresh" product.

(b) Temperature abused samples were subject to storage at −10° C. for 1 or 2 weeks, and then subsequently stored at −20° C. before analysis.

TABLE 4

| Process details and product overrun for products prepared from Mixes A, B, and C. | | | |
|---|---|---|---|
| Sample | Shear time at 1200 rpm min | Overrun % | End product temperature ° C. |
| A (Na Cas) | 1 | 103 | −5.3 |
| B (SMP) | 1 | 98 | −8 |
| B (SMP) | 1 | 94 | −5.6 |
| C (HFB II) | 10 | 75 | −5 |

Final products were analysed as follows:

Overrun of freshly made product

SEM analysis on fresh and temperature abused product

Melting behaviour on fresh and temperature abused product

Overrun

The overrun for each of the products is summarised in Table 4. All of the mixes were aeratable and incorporated significant amounts of air.

Microstructural Stability: Methodology

Scanning Electron Microscopy (SEM)

The microstructure of each products was visualised using Low Temperature Scanning Electron Microscopy (LTSEM). The sample was cooled to −80° C. on dry ice and a sample section cut. This section, approximately 5 mm×5 mm×10 mm in size, was mounted on a sample holder using a Tissue Tek: OCT™ compound (PVA 11%, Carbowax 5% and 85% non-reactive components). The sample including the holder was plunged into liquid nitrogen slush and transferred to a low temperature preparation chamber: Oxford Instrument CT1500HF. The chamber is under vacuum, approximately $10^{-4}$ bar, and the sample is warmed up to −90° C. Ice is slowly etched to reveal surface details not caused by the ice itself, so water is removed at this temperature under constant vacuum for 60 to 90 seconds. Once etched, the sample is cooled to −110° C. ending up the sublimation, and coated with gold using argon plasma. This process also takes place under vacuum with an applied pressure of $10^{-1}$ millibars and current of 6 milliamps for 45 seconds. The sample is then transferred to a conventional Scanning Electron Microscope (JSM 5600), fitted with an Oxford Instruments cold stage at a temperature of −160° C. The sample is examined and areas of interest captured via digital image acquisition software.

Freeze Fracture Transmission Electron Microscopy (TEM)

A small block, approximately 5 mm×3 mm×3 mm was cut from the sample on an aluminium plate placed on a bed of dry ice using a cold scalpel. The sample block was mounted vertically in a large 'top hat' freeze fracture holder using Tissue-Tek O.C.T Compound (Sakura Finetek, Europe BV). The holder was immediately placed in the transfer device of the Cressingtion CFE-50 under liquid nitrogen and transferred to the freeze fracture chamber (−180° C.). The sample was fractured with one single blow from the swinging microtome knife, and then etched for 10 minutes at −95° C. The etched surface was rotary shadowed (45°) with platinum/carbon to a thickness of 2 nm then coated with carbon to a thickness of 10 nm. The coated sample was removed from the chamber and transfer device and the metal replica floated off the sample, onto water. The replica pieces were cleaned in chromic acid and washed several times with water before being collected on 400 mesh copper EM grids. The grids were allowed to dry before examination by TEM.

TEM examination was carried out using a JEOL 1200 EX II microscope operated at 100 KV. Images were obtained using a Bioscan camera and Digital Micrograph software (Gatan Inc).

Microstructural Analysis: Results

Figure 2:
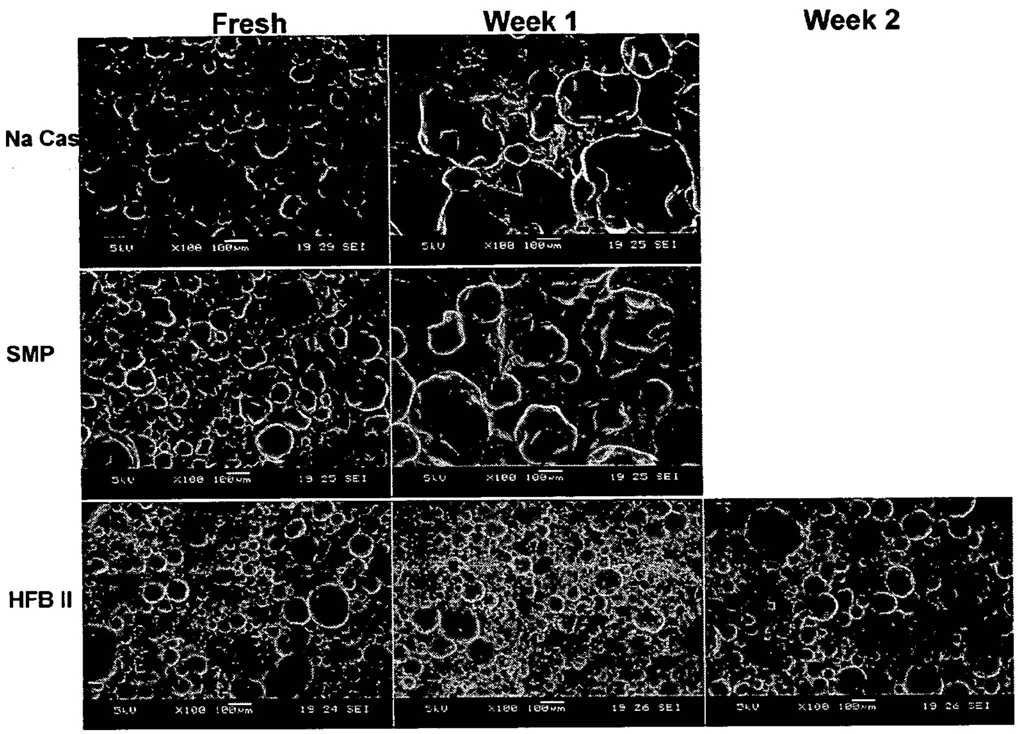
FIG. 2 is a scanning electron micrograph of aerated frozen product microstructures—fresh and after abuse (Magnification ×100)
Figure 3:
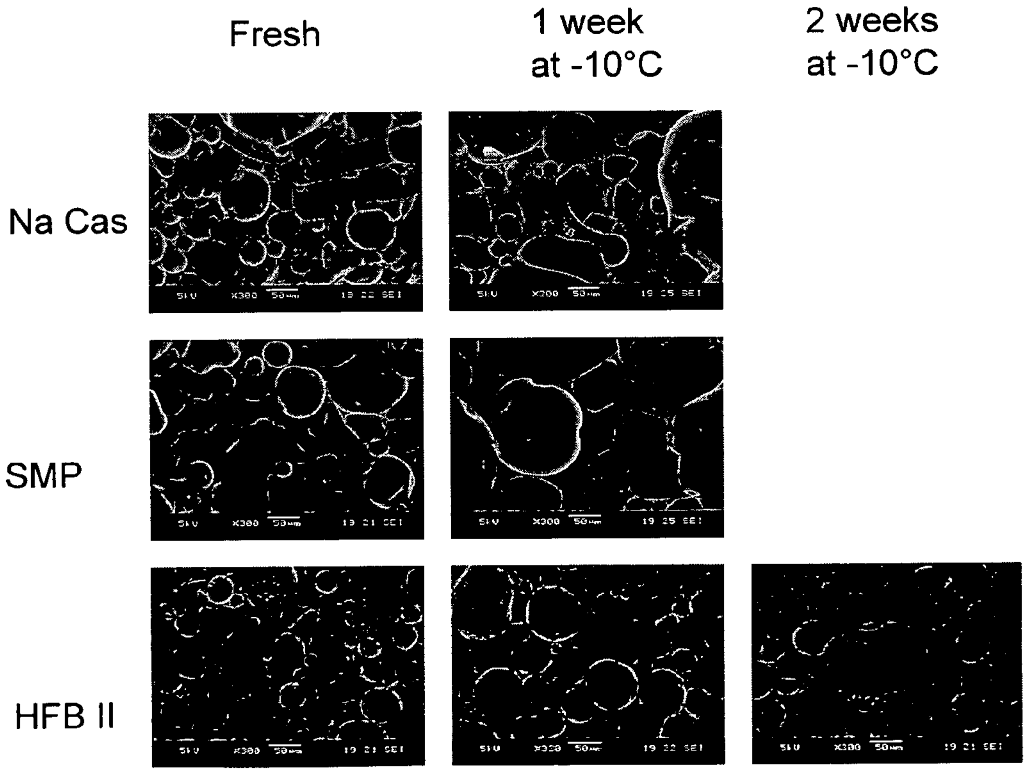
FIG. 3 is a scanning electron micrograph of aerated frozen product microstructures—fresh and after abuse (Magnification ×300)

Scanning Electron Microscopy (SEM) was used to examine the microstructure of the fresh and temperature abused frozen products. Representative images can be seen in FIGS. 2 and 3 at different magnifications.

The results from the fresh samples showed that HFB II containing product (prepared from Mix C) were significantly and surprisingly different to those containing more conventional proteins (i.e. Mix A or B). The different properties observed were: smaller air cells, smaller ice crystals, more angular ice crystals, and slightly more accreted ice crystals. For products A and B, we approximate the ice crystal size in the fresh samples to be 50-100 μm diameter. For product C, we approximate the ice crystal size to be 40-60 μm diameter.

After temperature abuse the SEM images clearly show that the HFB II containing product (from Mix C) has retained its original microstructure, i.e. there is relatively little apparent ice crystal and air bubble coarsening. This is the case after 1 and 2 weeks storage at −10° C. However, the prototypes containing Na Cas and SMP (from Mix A and B, respectively) show very severe coarsening of the gas and ice structure under temperature abused at −10° C. after just one week.

Overall, it is clear that the frozen product made containing HFBII shows much greater stability to temperature abuse than the frozen product made using sodium caseinate or skim milk powder. HFBII has an influence on both air bubble and ice crystal size and stability.

Melting Behaviour: Methodology

Samples of frozen product were placed on a metal grid at room temperature (20° C.). Differences in the way the products melted, notably shape retention and foam stability, were observed as a function of time.

Melting Behaviour: Results

These microstructural differences (stable foam and stable ice) had some impact on the melting behavior of the frozen product. The aerated frozen sample made from Mix C (containing HFBII) retained its shape better on melting, compared to the product made with sodium caseinate or skimmed milk powder (i.e. Mixes A and B, respectively).

As the ice melted and formed water, it flowed through the melting grid. However, for the product with HFBII, much of the foam also remained on the grid with some stable drops of foam observed beneath (data not shown)—neither of these characteristics was observed with the conventional proteins (sodium caseinate and skimmed milk powder). This illustrates the differences in the foam stability between each of the proteins used.

Textural Differences Between Products A, B, and C

Clear differences in texture between the three samples could also be observed after one week storage at −10° C. (i.e. temperature abused samples). On handling the product made using sodium caseinate (A) and skimmed milk powder (B), these were noticed to have a very soft and very flaky texture, which was difficult to cleanly remove from the silicon paper used to line the sample pot. The product made using HFBII (C), on the other hand, was very firm and released from the silicon paper lining the sample pot very cleanly. In other words, the product prepared using HFBII shows much greater stability to temperature abuse on both a microscopic and macroscopic scale than product prepared using sodium caseinate or skim milk powder.

EXAMPLE 2

Non-Aerated Frozen Products

Two solutions were prepared, one containing hydrophobin HFBII from *Trichoderma reesei*, the other not. The compositions of the solutions were as shown in Table 5.

TABLE 5

| Formulations for non-aerated products | | |
|---|---|---|
| Ingredient | Sample 1 | Sample 2 |
| | Concentration/wt % | |
| HFB II | 0 | 0.1 |
| Xanthan | 0.5 | 0.5 |
| Sucrose | 25.0 | 25.0 |
| Water | 74.5 | 74.4 |

The HFBII was supplied by VTT Biotechnology, as described above, and the sucrose by Tate & Lyle. The xanthan was a cold-water dispersible grade (Keltrol RD) supplied by CP Kelco (Atlanta, USA).

Preparation and Analysis of the Non-Aerated Frozen Products

Both solutions were prepared in 100 g batches. The sucrose/xanthan solution was prepared by adding the required amount of deionised water at room temperature to a dry mixture of sucrose and xanthan. This was then mixed using a magnetic stirrer until the solutes were completely dissolved. In the case of Sample 2, HFBII was then added as an aliquot of a 5.3 mg/ml solution, after which the solution was mixed again on the magnetic stirrer for a further 10 minutes.

Freezing of the non-aerated solutions was carried out quiescently (i.e. without simultaneous application of shear). Each solution was used to fill a small petri dish of 8 ml volume. These were then placed within a domestic freezer cabinet at −18° C. for 24 hours, during which period freezing of the samples occurred.

Following freezing, the microstructure of each sample was analysed by SEM using the same preparation method as described in Example 1.

Microstructural Analysis—Results

Figure 4:
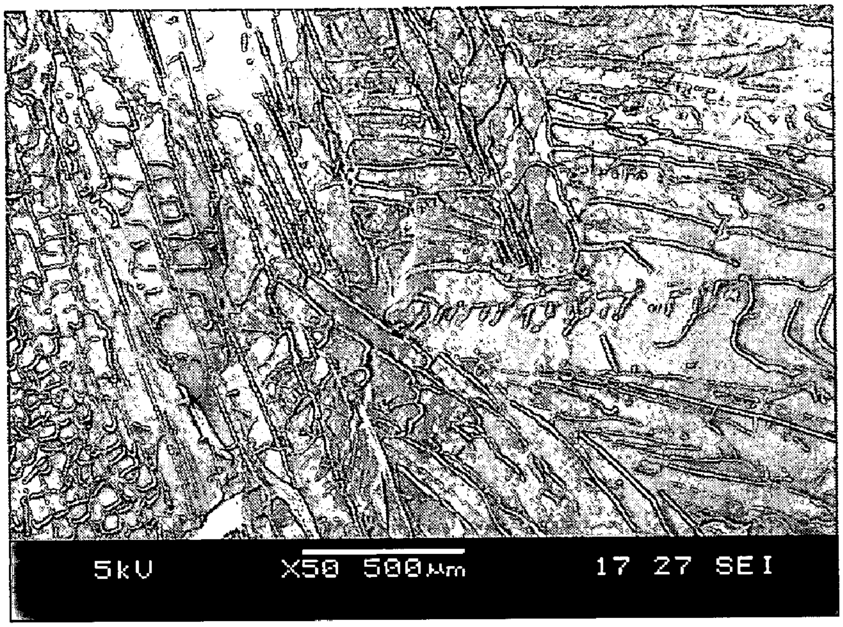
FIG. 4 shows scanning electron micrographs of unaerated product microstructures (no HFBII) (50× magnification).
Figure 4:
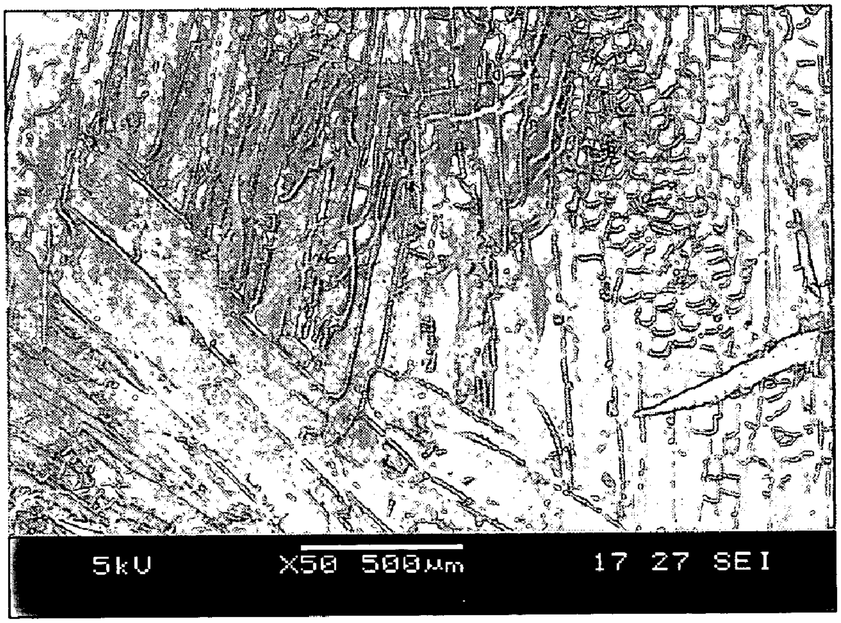
Figure 5:
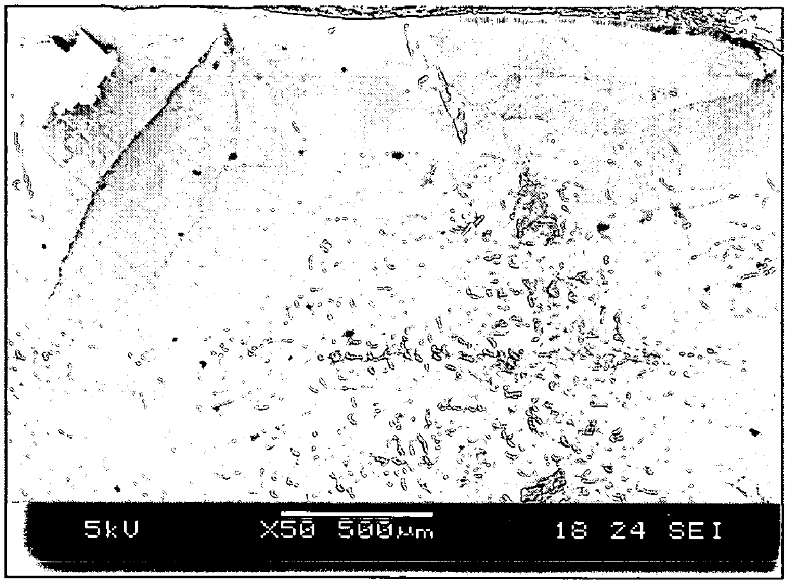
FIG. 5 shows scanning electron micrographs of unaerated product microstructures (with HFBII) (50× magnification).
Figure 5:
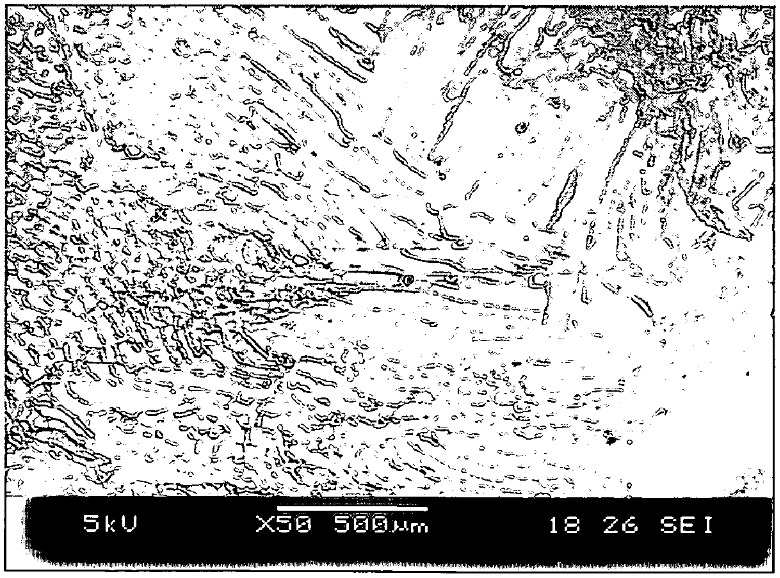

Representative SEM images of each sample at 50× magnification can be seen in FIGS. 4 and 5. It can be discerned that the microstructure of the solution containing HFBII (sample 2) is finer and contains ice crystal with smaller characteristic dimensions. For instance, the elongated dendritic structures in sample 1 (FIG. 4) are wider and longer than those seen in sample 2 (FIG. 5). This illustrates the influence of hydrophobin on reducing the ice crystal growth process—resulting in crystals of smaller size.

The various features and embodiments of the present invention, referred to in individual sections above apply, as appropriate, to other sections, mutatis mutandis. Consequently features specified in one section may be combined with features specified in other sections, as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A frozen food product comprising a frozen continuous oil and water emulsion, including stabilizer, fat, sugar and an amount of isolated class II hydrophobin in a range of at least 0 wt % but less than 1.0 wt %, wherein the amount of the hydrophobin in said range is effective to inhibit ice crystal growth in the oil and water emulsion when the temperature of the frozen food product is maintained at −10 degrees C. for two weeks.

2. The frozen food product of claim 1 wherein the hydrophobin is a class II hydrophobin which is obtained from *Trichoderma reesei.*

3. The frozen food product of claim 1 which is unaerated.

4. The frozen food product of claim 1 which is a frozen confectionery product.

5. The frozen food product of claim 1, wherein said frozen food product is selected from the group including ice cream, milk ice, frozen yoghurt, sherbet, frozen custard, water ice, slushes, sorbet, granitas, and frozen purees.

6. The food product according to claim 1 wherein said composition is shear frozen.

7. The food product according to claim 1 having an overrun of from 25% to 300%.

8. The food product according to claim 1 wherein said hydrophobin is one which is obtained from *Trichoderma.*

9. The food product according to claim 1 which is sheared and frozen simultaneously in a vessel comprising a rotor.

10. The food product according to claim 9 wherein said rotor further comprises high shear blades.

11. The food product according to claim 9 wherein said rotor comprises an impeller of correct proportions to scrape the surface of the edge of the vessel as the impeller rotates.

12. The frozen food product of claim 1, wherein the hydrophobin is made using amino acid sequences at least 95% identical to the amino acid sequence of class II hydrophobin identified in nature.

13. The frozen food product of claim 1, wherein the stabilizer comprises xanthan gum.

* * * * *

SEQUENCE LISTING

```
<160> NUMBER OF SEQ ID NOS: 2

<210> SEQ ID NO 1
<211> LENGTH: 4106
<212> TYPE: PRT
<213> ORGANISM: Artificial Sequence
<220> FEATURE:
<223> OTHER INFORMATION: Hydrophobin
<220> FEATURE:
<221> NAME/KEY: MISC_FEATURE
<222> LOCATION: (1)..(2000)
<223> OTHER INFORMATION: Xaa may be any amino acid; One or more Xaa
      may be missing
<220> FEATURE:
<221> NAME/KEY: MISC_FEATURE
<222> LOCATION: (2002)..(2006)
<223> OTHER INFORMATION: Xaa may be any amino acid;
<220> FEATURE:
<221> NAME/KEY: MISC_FEATURE
<222> LOCATION: (2007)..(2010)
<223> OTHER INFORMATION: Xaa may be any amino acid; One or more Xaa
      may be missing
<220> FEATURE:
<221> NAME/KEY: MISC_FEATURE
<222> LOCATION: (2013)..(2023)
<223> OTHER INFORMATION: Xaa may be any amino acid;
<220> FEATURE:
<221> NAME/KEY: MISC_FEATURE
<222> LOCATION: (2024)..(2051)
<223> OTHER INFORMATION: Xaa may be any amino acid; One or more Xaa
      may be missing
<220> FEATURE:
<221> NAME/KEY: MISC_FEATURE
<222> LOCATION: (2053)..(2060)
<223> OTHER INFORMATION: Xaa may be any amino acid;
<220> FEATURE:
<221> NAME/KEY: MISC_FEATURE
```

<222> LOCATION: (2061)..(2075)
<223> OTHER INFORMATION: Xaa may be any amino acid; One or more Xaa may be missing
<220> FEATURE:
<221> NAME/KEY: MISC_FEATURE
<222> LOCATION: (2077)..(2081)
<223> OTHER INFORMATION: Xaa may be any amino acid;
<220> FEATURE:
<221> NAME/KEY: MISC_FEATURE
<222> LOCATION: (2082)..(2085)
<223> OTHER INFORMATION: Xaa may be any amino acid; One or more Xaa may be missing
<220> FEATURE:
<221> NAME/KEY: MISC_FEATURE
<222> LOCATION: (2088)..(2093)
<223> OTHER INFORMATION: Xaa may be any amino acid;
<220> FEATURE:
<221> NAME/KEY: MISC_FEATURE
<222> LOCATION: (2094)..(2105)
<223> OTHER INFORMATION: Xaa may be any amino acid; One or more Xaa may be missing
<220> FEATURE:
<221> NAME/KEY: MISC_FEATURE
<222> LOCATION: (2107)..(4106)
<223> OTHER INFORMATION: Xaa may be any amino acid; One or more Xaa may be missing

<400> SEQUENCE: 1

Xaa Xaa Xaa Xaa Xaa Xaa Xaa Xaa Xaa Xaa Xaa Xaa Xaa Xaa Xaa Xaa
1 5 10 15

Xaa Xaa Xaa Xaa Xaa Xaa Xaa Xaa Xaa Xaa Xaa Xaa Xaa Xaa Xaa Xaa
20 25 30

Xaa Xaa Xaa Xaa Xaa Xaa Xaa Xaa Xaa Xaa Xaa Xaa Xaa Xaa Xaa Xaa
35 40 45

Xaa Xaa Xaa Xaa Xaa Xaa Xaa Xaa Xaa Xaa Xaa Xaa Xaa Xaa Xaa Xaa
50 55 60

Xaa Xaa Xaa Xaa Xaa Xaa Xaa Xaa Xaa Xaa Xaa Xaa Xaa Xaa Xaa Xaa
65 70 75 80

Xaa Xaa Xaa Xaa Xaa Xaa Xaa Xaa Xaa Xaa Xaa Xaa Xaa Xaa Xaa Xaa
85 90 95

Xaa Xaa Xaa Xaa Xaa Xaa Xaa Xaa Xaa Xaa Xaa Xaa Xaa Xaa Xaa Xaa
100 105 110

Xaa Xaa Xaa Xaa Xaa Xaa Xaa Xaa Xaa Xaa Xaa Xaa Xaa Xaa Xaa Xaa
115 120 125

Xaa Xaa Xaa Xaa Xaa Xaa Xaa Xaa Xaa Xaa Xaa Xaa Xaa Xaa Xaa Xaa
130 135 140

Xaa Xaa Xaa Xaa Xaa Xaa Xaa Xaa Xaa Xaa Xaa Xaa Xaa Xaa Xaa Xaa
145 150 155 160

Xaa Xaa Xaa Xaa Xaa Xaa Xaa Xaa Xaa Xaa Xaa Xaa Xaa Xaa Xaa Xaa
165 170 175

Xaa Xaa Xaa Xaa Xaa Xaa Xaa Xaa Xaa Xaa Xaa Xaa Xaa Xaa Xaa Xaa
180 185 190

Xaa Xaa Xaa Xaa Xaa Xaa Xaa Xaa Xaa Xaa Xaa Xaa Xaa Xaa Xaa Xaa
195 200 205

Xaa Xaa Xaa Xaa Xaa Xaa Xaa Xaa Xaa Xaa Xaa Xaa Xaa Xaa Xaa Xaa
210 215 220

Xaa Xaa Xaa Xaa Xaa Xaa Xaa Xaa Xaa Xaa Xaa Xaa Xaa Xaa Xaa Xaa
225 230 235 240

Xaa Xaa Xaa Xaa Xaa Xaa Xaa Xaa Xaa Xaa Xaa Xaa Xaa Xaa Xaa Xaa
245 250 255

Xaa Xaa Xaa Xaa Xaa Xaa Xaa Xaa Xaa Xaa Xaa Xaa Xaa Xaa Xaa Xaa
260 265 270

-continued

```
Xaa Xaa Xaa Xaa Xaa Xaa Xaa Xaa Xaa Xaa Xaa Xaa Xaa Xaa Xaa Xaa
        275                 280                 285

Xaa Xaa Xaa Xaa Xaa Xaa Xaa Xaa Xaa Xaa Xaa Xaa Xaa Xaa Xaa Xaa
    290                 295                 300

Xaa Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa Xaa
                325                 330                 335

Xaa Xaa Xaa Xaa Xaa Xaa Xaa Xaa Xaa Xaa Xaa Xaa Xaa Xaa Xaa Xaa
            340                 345                 350

Xaa Xaa Xaa Xaa Xaa Xaa Xaa Xaa Xaa Xaa Xaa Xaa Xaa Xaa Xaa Xaa
        355                 360                 365

Xaa Xaa Xaa Xaa Xaa Xaa Xaa Xaa Xaa Xaa Xaa Xaa Xaa Xaa Xaa Xaa
    370                 375                 380

Xaa Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa Xaa Xaa Xaa Xaa Xaa Xaa Xaa
                405                 410                 415

Xaa Xaa Xaa Xaa Xaa Xaa Xaa Xaa Xaa Xaa Xaa Xaa Xaa Xaa Xaa Xaa
            420                 425                 430

Xaa Xaa Xaa Xaa Xaa Xaa Xaa Xaa Xaa Xaa Xaa Xaa Xaa Xaa Xaa Xaa
        435                 440                 445

Xaa Xaa Xaa Xaa Xaa Xaa Xaa Xaa Xaa Xaa Xaa Xaa Xaa Xaa Xaa Xaa
    450                 455                 460

Xaa Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa Xaa
                485                 490                 495

Xaa Xaa Xaa Xaa Xaa Xaa Xaa Xaa Xaa Xaa Xaa Xaa Xaa Xaa Xaa Xaa
            500                 505                 510

Xaa Xaa Xaa Xaa Xaa Xaa Xaa Xaa Xaa Xaa Xaa Xaa Xaa Xaa Xaa Xaa
        515                 520                 525

Xaa Xaa Xaa Xaa Xaa Xaa Xaa Xaa Xaa Xaa Xaa Xaa Xaa Xaa Xaa Xaa
    530                 535                 540

Xaa Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa Xaa
                565                 570                 575

Xaa Xaa Xaa Xaa Xaa Xaa Xaa Xaa Xaa Xaa Xaa Xaa Xaa Xaa Xaa Xaa
            580                 585                 590

Xaa Xaa Xaa Xaa Xaa Xaa Xaa Xaa Xaa Xaa Xaa Xaa Xaa Xaa Xaa Xaa
        595                 600                 605

Xaa Xaa Xaa Xaa Xaa Xaa Xaa Xaa Xaa Xaa Xaa Xaa Xaa Xaa Xaa Xaa
    610                 615                 620

Xaa Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa Xaa
                645                 650                 655

Xaa Xaa Xaa Xaa Xaa Xaa Xaa Xaa Xaa Xaa Xaa Xaa Xaa Xaa Xaa Xaa
            660                 665                 670

Xaa Xaa Xaa Xaa Xaa Xaa Xaa Xaa Xaa Xaa Xaa Xaa Xaa Xaa Xaa Xaa
        675                 680                 685

Xaa Xaa Xaa Xaa Xaa Xaa Xaa Xaa Xaa Xaa Xaa Xaa Xaa Xaa Xaa Xaa
    690                 695                 700
```

```
Xaa Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa Xaa
                725                 730                 735

Xaa Xaa Xaa Xaa Xaa Xaa Xaa Xaa Xaa Xaa Xaa Xaa Xaa Xaa Xaa Xaa
            740                 745                 750

Xaa Xaa Xaa Xaa Xaa Xaa Xaa Xaa Xaa Xaa Xaa Xaa Xaa Xaa Xaa Xaa
        755                 760                 765

Xaa Xaa Xaa Xaa Xaa Xaa Xaa Xaa Xaa Xaa Xaa Xaa Xaa Xaa Xaa Xaa
    770                 775                 780

Xaa Xaa Xaa Xaa Xaa Xaa Xaa Xaa Xaa Xaa Xaa Xaa Xaa Xaa Xaa Xaa
785                 790                 795                 800

Xaa Xaa Xaa Xaa Xaa Xaa Xaa Xaa Xaa Xaa Xaa Xaa Xaa Xaa Xaa Xaa
                805                 810                 815

Xaa Xaa Xaa Xaa Xaa Xaa Xaa Xaa Xaa Xaa Xaa Xaa Xaa Xaa Xaa Xaa
            820                 825                 830

Xaa Xaa Xaa Xaa Xaa Xaa Xaa Xaa Xaa Xaa Xaa Xaa Xaa Xaa Xaa Xaa
        835                 840                 845

Xaa Xaa Xaa Xaa Xaa Xaa Xaa Xaa Xaa Xaa Xaa Xaa Xaa Xaa Xaa Xaa
    850                 855                 860

Xaa Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa Xaa
                885                 890                 895

Xaa Xaa Xaa Xaa Xaa Xaa Xaa Xaa Xaa Xaa Xaa Xaa Xaa Xaa Xaa Xaa
            900                 905                 910

Xaa Xaa Xaa Xaa Xaa Xaa Xaa Xaa Xaa Xaa Xaa Xaa Xaa Xaa Xaa Xaa
        915                 920                 925

Xaa Xaa Xaa Xaa Xaa Xaa Xaa Xaa Xaa Xaa Xaa Xaa Xaa Xaa Xaa Xaa
    930                 935                 940

Xaa Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa Xaa
                965                 970                 975

Xaa Xaa Xaa Xaa Xaa Xaa Xaa Xaa Xaa Xaa Xaa Xaa Xaa Xaa Xaa Xaa
            980                 985                 990

Xaa Xaa Xaa Xaa Xaa Xaa Xaa Xaa  Xaa Xaa Xaa Xaa Xaa  Xaa Xaa Xaa
        995                 1000                 1005

Xaa Xaa  Xaa Xaa Xaa Xaa Xaa  Xaa Xaa Xaa Xaa Xaa  Xaa Xaa Xaa
    1010                 1015                 1020

Xaa Xaa  Xaa Xaa Xaa Xaa Xaa  Xaa Xaa Xaa Xaa Xaa  Xaa Xaa Xaa
    1025                 1030                 1035

Xaa Xaa  Xaa Xaa Xaa Xaa Xaa  Xaa Xaa Xaa Xaa Xaa  Xaa Xaa Xaa
    1040                 1045                 1050

Xaa Xaa  Xaa Xaa Xaa Xaa Xaa  Xaa Xaa Xaa Xaa Xaa  Xaa Xaa Xaa
    1055                 1060                 1065

Xaa Xaa  Xaa Xaa Xaa Xaa Xaa  Xaa Xaa Xaa Xaa Xaa  Xaa Xaa Xaa
    1070                 1075                 1080

Xaa Xaa  Xaa Xaa Xaa Xaa Xaa  Xaa Xaa Xaa Xaa Xaa  Xaa Xaa Xaa
    1085                 1090                 1095

Xaa Xaa  Xaa Xaa Xaa Xaa Xaa  Xaa Xaa Xaa Xaa Xaa  Xaa Xaa Xaa
    1100                 1105                 1110

Xaa Xaa  Xaa Xaa Xaa Xaa Xaa  Xaa Xaa Xaa Xaa Xaa  Xaa Xaa Xaa
```

```
    1115                1120                1125

Xaa Xaa  Xaa Xaa Xaa Xaa Xaa  Xaa Xaa Xaa Xaa Xaa  Xaa Xaa Xaa
    1130                1135                1140

Xaa Xaa  Xaa Xaa Xaa Xaa Xaa  Xaa Xaa Xaa Xaa Xaa  Xaa Xaa Xaa
    1145                1150                1155

Xaa Xaa  Xaa Xaa Xaa Xaa Xaa  Xaa Xaa Xaa Xaa Xaa  Xaa Xaa Xaa
    1160                1165                1170

Xaa Xaa  Xaa Xaa Xaa Xaa Xaa  Xaa Xaa Xaa Xaa Xaa  Xaa Xaa Xaa
    1175                1180                1185

Xaa Xaa  Xaa Xaa Xaa Xaa Xaa  Xaa Xaa Xaa Xaa Xaa  Xaa Xaa Xaa
    1190                1195                1200

Xaa Xaa  Xaa Xaa Xaa Xaa Xaa  Xaa Xaa Xaa Xaa Xaa  Xaa Xaa Xaa
    1205                1210                1215

Xaa Xaa  Xaa Xaa Xaa Xaa Xaa  Xaa Xaa Xaa Xaa Xaa  Xaa Xaa Xaa
    1220                1225                1230

Xaa Xaa  Xaa Xaa Xaa Xaa Xaa  Xaa Xaa Xaa Xaa Xaa  Xaa Xaa Xaa
    1235                1240                1245

Xaa Xaa  Xaa Xaa Xaa Xaa Xaa  Xaa Xaa Xaa Xaa Xaa  Xaa Xaa Xaa
    1250                1255                1260

Xaa Xaa  Xaa Xaa Xaa Xaa Xaa  Xaa Xaa Xaa Xaa Xaa  Xaa Xaa Xaa
    1265                1270                1275

Xaa Xaa  Xaa Xaa Xaa Xaa Xaa  Xaa Xaa Xaa Xaa Xaa  Xaa Xaa Xaa
    1280                1285                1290

Xaa Xaa  Xaa Xaa Xaa Xaa Xaa  Xaa Xaa Xaa Xaa Xaa  Xaa Xaa Xaa
    1295                1300                1305

Xaa Xaa  Xaa Xaa Xaa Xaa Xaa  Xaa Xaa Xaa Xaa Xaa  Xaa Xaa Xaa
    1310                1315                1320

Xaa Xaa  Xaa Xaa Xaa Xaa Xaa  Xaa Xaa Xaa Xaa Xaa  Xaa Xaa Xaa
    1325                1330                1335

Xaa Xaa  Xaa Xaa Xaa Xaa Xaa  Xaa Xaa Xaa Xaa Xaa  Xaa Xaa Xaa
    1340                1345                1350

Xaa Xaa  Xaa Xaa Xaa Xaa Xaa  Xaa Xaa Xaa Xaa Xaa  Xaa Xaa Xaa
    1355                1360                1365

Xaa Xaa  Xaa Xaa Xaa Xaa Xaa  Xaa Xaa Xaa Xaa Xaa  Xaa Xaa Xaa
    1370                1375                1380

Xaa Xaa  Xaa Xaa Xaa Xaa Xaa  Xaa Xaa Xaa Xaa Xaa  Xaa Xaa Xaa
    1385                1390                1395

Xaa Xaa  Xaa Xaa Xaa Xaa Xaa  Xaa Xaa Xaa Xaa Xaa  Xaa Xaa Xaa
    1400                1405                1410

Xaa Xaa  Xaa Xaa Xaa Xaa Xaa  Xaa Xaa Xaa Xaa Xaa  Xaa Xaa Xaa
    1415                1420                1425

Xaa Xaa  Xaa Xaa Xaa Xaa Xaa  Xaa Xaa Xaa Xaa Xaa  Xaa Xaa Xaa
    1430                1435                1440

Xaa Xaa  Xaa Xaa Xaa Xaa Xaa  Xaa Xaa Xaa Xaa Xaa  Xaa Xaa Xaa
    1445                1450                1455

Xaa Xaa  Xaa Xaa Xaa Xaa Xaa  Xaa Xaa Xaa Xaa Xaa  Xaa Xaa Xaa
    1460                1465                1470

Xaa Xaa  Xaa Xaa Xaa Xaa Xaa  Xaa Xaa Xaa Xaa Xaa  Xaa Xaa Xaa
    1475                1480                1485

Xaa Xaa  Xaa Xaa Xaa Xaa Xaa  Xaa Xaa Xaa Xaa Xaa  Xaa Xaa Xaa
    1490                1495                1500

Xaa Xaa  Xaa Xaa Xaa Xaa Xaa  Xaa Xaa Xaa Xaa Xaa  Xaa Xaa Xaa
    1505                1510                1515
```

-continued

```
Xaa Xaa  Xaa Xaa Xaa Xaa Xaa  Xaa Xaa Xaa Xaa Xaa  Xaa Xaa Xaa
    1520                 1525                 1530

Xaa Xaa  Xaa Xaa Xaa Xaa Xaa  Xaa Xaa Xaa Xaa Xaa  Xaa Xaa Xaa
    1535                 1540                 1545

Xaa Xaa  Xaa Xaa Xaa Xaa Xaa  Xaa Xaa Xaa Xaa Xaa  Xaa Xaa Xaa
    1550                 1555                 1560

Xaa Xaa  Xaa Xaa Xaa Xaa Xaa  Xaa Xaa Xaa Xaa Xaa  Xaa Xaa Xaa
    1565                 1570                 1575

Xaa Xaa  Xaa Xaa Xaa Xaa Xaa  Xaa Xaa Xaa Xaa Xaa  Xaa Xaa Xaa
    1580                 1585                 1590

Xaa Xaa  Xaa Xaa Xaa Xaa Xaa  Xaa Xaa Xaa Xaa Xaa  Xaa Xaa Xaa
    1595                 1600                 1605

Xaa Xaa  Xaa Xaa Xaa Xaa Xaa  Xaa Xaa Xaa Xaa Xaa  Xaa Xaa Xaa
    1610                 1615                 1620

Xaa Xaa  Xaa Xaa Xaa Xaa Xaa  Xaa Xaa Xaa Xaa Xaa  Xaa Xaa Xaa
    1625                 1630                 1635

Xaa Xaa  Xaa Xaa Xaa Xaa Xaa  Xaa Xaa Xaa Xaa Xaa  Xaa Xaa Xaa
    1640                 1645                 1650

Xaa Xaa  Xaa Xaa Xaa Xaa Xaa  Xaa Xaa Xaa Xaa Xaa  Xaa Xaa Xaa
    1655                 1660                 1665

Xaa Xaa  Xaa Xaa Xaa Xaa Xaa  Xaa Xaa Xaa Xaa Xaa  Xaa Xaa Xaa
    1670                 1675                 1680

Xaa Xaa  Xaa Xaa Xaa Xaa Xaa  Xaa Xaa Xaa Xaa Xaa  Xaa Xaa Xaa
    1685                 1690                 1695

Xaa Xaa  Xaa Xaa Xaa Xaa Xaa  Xaa Xaa Xaa Xaa Xaa  Xaa Xaa Xaa
    1700                 1705                 1710

Xaa Xaa  Xaa Xaa Xaa Xaa Xaa  Xaa Xaa Xaa Xaa Xaa  Xaa Xaa Xaa
    1715                 1720                 1725

Xaa Xaa  Xaa Xaa Xaa Xaa Xaa  Xaa Xaa Xaa Xaa Xaa  Xaa Xaa Xaa
    1730                 1735                 1740

Xaa Xaa  Xaa Xaa Xaa Xaa Xaa  Xaa Xaa Xaa Xaa Xaa  Xaa Xaa Xaa
    1745                 1750                 1755

Xaa Xaa  Xaa Xaa Xaa Xaa Xaa  Xaa Xaa Xaa Xaa Xaa  Xaa Xaa Xaa
    1760                 1765                 1770

Xaa Xaa  Xaa Xaa Xaa Xaa Xaa  Xaa Xaa Xaa Xaa Xaa  Xaa Xaa Xaa
    1775                 1780                 1785

Xaa Xaa  Xaa Xaa Xaa Xaa Xaa  Xaa Xaa Xaa Xaa Xaa  Xaa Xaa Xaa
    1790                 1795                 1800

Xaa Xaa  Xaa Xaa Xaa Xaa Xaa  Xaa Xaa Xaa Xaa Xaa  Xaa Xaa Xaa
    1805                 1810                 1815

Xaa Xaa  Xaa Xaa Xaa Xaa Xaa  Xaa Xaa Xaa Xaa Xaa  Xaa Xaa Xaa
    1820                 1825                 1830

Xaa Xaa  Xaa Xaa Xaa Xaa Xaa  Xaa Xaa Xaa Xaa Xaa  Xaa Xaa Xaa
    1835                 1840                 1845

Xaa Xaa  Xaa Xaa Xaa Xaa Xaa  Xaa Xaa Xaa Xaa Xaa  Xaa Xaa Xaa
    1850                 1855                 1860

Xaa Xaa  Xaa Xaa Xaa Xaa Xaa  Xaa Xaa Xaa Xaa Xaa  Xaa Xaa Xaa
    1865                 1870                 1875

Xaa Xaa  Xaa Xaa Xaa Xaa Xaa  Xaa Xaa Xaa Xaa Xaa  Xaa Xaa Xaa
    1880                 1885                 1890

Xaa Xaa  Xaa Xaa Xaa Xaa Xaa  Xaa Xaa Xaa Xaa Xaa  Xaa Xaa Xaa
    1895                 1900                 1905

Xaa Xaa  Xaa Xaa Xaa Xaa Xaa  Xaa Xaa Xaa Xaa Xaa  Xaa Xaa Xaa
    1910                 1915                 1920
```

```
Xaa Xaa  Xaa Xaa Xaa Xaa Xaa  Xaa Xaa Xaa Xaa Xaa  Xaa Xaa Xaa
    1925                 1930                 1935

Xaa Xaa  Xaa Xaa Xaa Xaa Xaa  Xaa Xaa Xaa Xaa Xaa  Xaa Xaa Xaa
    1940                 1945                 1950

Xaa Xaa  Xaa Xaa Xaa Xaa Xaa  Xaa Xaa Xaa Xaa Xaa  Xaa Xaa Xaa
    1955                 1960                 1965

Xaa Xaa  Xaa Xaa Xaa Xaa Xaa  Xaa Xaa Xaa Xaa Xaa  Xaa Xaa Xaa
    1970                 1975                 1980

Xaa Xaa  Xaa Xaa Xaa Xaa Xaa  Xaa Xaa Xaa Xaa Xaa  Xaa Xaa Xaa
    1985                 1990                 1995

Xaa Xaa  Cys Xaa Xaa Xaa Xaa  Xaa Xaa Xaa Xaa Xaa  Cys Cys Xaa
    2000                 2005                 2010

Xaa Xaa  Xaa Xaa Xaa Xaa Xaa  Xaa Xaa Xaa Xaa Xaa  Xaa Xaa Xaa
    2015                 2020                 2025

Xaa Xaa  Xaa Xaa Xaa Xaa Xaa  Xaa Xaa Xaa Xaa Xaa  Xaa Xaa Xaa
    2030                 2035                 2040

Xaa Xaa  Xaa Xaa Xaa Xaa Xaa  Xaa Cys Xaa Xaa Xaa  Xaa Xaa Xaa
    2045                 2050                 2055

Xaa Xaa  Xaa Xaa Xaa Xaa Xaa  Xaa Xaa Xaa Xaa Xaa  Xaa Xaa Xaa
    2060                 2065                 2070

Xaa Xaa  Cys Xaa Xaa Xaa Xaa  Xaa Xaa Xaa Xaa Xaa  Cys Cys Xaa
    2075                 2080                 2085

Xaa Xaa  Xaa Xaa Xaa Xaa Xaa  Xaa Xaa Xaa Xaa Xaa  Xaa Xaa Xaa
    2090                 2095                 2100

Xaa Xaa  Cys Xaa Xaa Xaa Xaa  Xaa Xaa Xaa Xaa Xaa  Xaa Xaa Xaa
    2105                 2110                 2115

Xaa Xaa  Xaa Xaa Xaa Xaa Xaa  Xaa Xaa Xaa Xaa Xaa  Xaa Xaa Xaa
    2120                 2125                 2130

Xaa Xaa  Xaa Xaa Xaa Xaa Xaa  Xaa Xaa Xaa Xaa Xaa  Xaa Xaa Xaa
    2135                 2140                 2145

Xaa Xaa  Xaa Xaa Xaa Xaa Xaa  Xaa Xaa Xaa Xaa Xaa  Xaa Xaa Xaa
    2150                 2155                 2160

Xaa Xaa  Xaa Xaa Xaa Xaa Xaa  Xaa Xaa Xaa Xaa Xaa  Xaa Xaa Xaa
    2165                 2170                 2175

Xaa Xaa  Xaa Xaa Xaa Xaa Xaa  Xaa Xaa Xaa Xaa Xaa  Xaa Xaa Xaa
    2180                 2185                 2190

Xaa Xaa  Xaa Xaa Xaa Xaa Xaa  Xaa Xaa Xaa Xaa Xaa  Xaa Xaa Xaa
    2195                 2200                 2205

Xaa Xaa  Xaa Xaa Xaa Xaa Xaa  Xaa Xaa Xaa Xaa Xaa  Xaa Xaa Xaa
    2210                 2215                 2220

Xaa Xaa  Xaa Xaa Xaa Xaa Xaa  Xaa Xaa Xaa Xaa Xaa  Xaa Xaa Xaa
    2225                 2230                 2235

Xaa Xaa  Xaa Xaa Xaa Xaa Xaa  Xaa Xaa Xaa Xaa Xaa  Xaa Xaa Xaa
    2240                 2245                 2250

Xaa Xaa  Xaa Xaa Xaa Xaa Xaa  Xaa Xaa Xaa Xaa Xaa  Xaa Xaa Xaa
    2255                 2260                 2265

Xaa Xaa  Xaa Xaa Xaa Xaa Xaa  Xaa Xaa Xaa Xaa Xaa  Xaa Xaa Xaa
    2270                 2275                 2280

Xaa Xaa  Xaa Xaa Xaa Xaa Xaa  Xaa Xaa Xaa Xaa Xaa  Xaa Xaa Xaa
    2285                 2290                 2295

Xaa Xaa  Xaa Xaa Xaa Xaa Xaa  Xaa Xaa Xaa Xaa Xaa  Xaa Xaa Xaa
    2300                 2305                 2310

Xaa Xaa  Xaa Xaa Xaa Xaa Xaa  Xaa Xaa Xaa Xaa Xaa  Xaa Xaa Xaa
```

2315 2320 2325

Xaa Xaa Xaa Xaa Xaa Xaa Xaa Xaa Xaa Xaa Xaa Xaa Xaa Xaa Xaa
2330 2335 2340

Xaa Xaa Xaa Xaa Xaa Xaa Xaa Xaa Xaa Xaa Xaa Xaa Xaa Xaa Xaa
2345 2350 2355

Xaa Xaa Xaa Xaa Xaa Xaa Xaa Xaa Xaa Xaa Xaa Xaa Xaa Xaa Xaa
2360 2365 2370

Xaa Xaa Xaa Xaa Xaa Xaa Xaa Xaa Xaa Xaa Xaa Xaa Xaa Xaa Xaa
2375 2380 2385

Xaa Xaa Xaa Xaa Xaa Xaa Xaa Xaa Xaa Xaa Xaa Xaa Xaa Xaa Xaa
2390 2395 2400

Xaa Xaa Xaa Xaa Xaa Xaa Xaa Xaa Xaa Xaa Xaa Xaa Xaa Xaa Xaa
2405 2410 2415

Xaa Xaa Xaa Xaa Xaa Xaa Xaa Xaa Xaa Xaa Xaa Xaa Xaa Xaa Xaa
2420 2425 2430

Xaa Xaa Xaa Xaa Xaa Xaa Xaa Xaa Xaa Xaa Xaa Xaa Xaa Xaa Xaa
2435 2440 2445

Xaa Xaa Xaa Xaa Xaa Xaa Xaa Xaa Xaa Xaa Xaa Xaa Xaa Xaa Xaa
2450 2455 2460

Xaa Xaa Xaa Xaa Xaa Xaa Xaa Xaa Xaa Xaa Xaa Xaa Xaa Xaa Xaa
2465 2470 2475

Xaa Xaa Xaa Xaa Xaa Xaa Xaa Xaa Xaa Xaa Xaa Xaa Xaa Xaa Xaa
2480 2485 2490

Xaa Xaa Xaa Xaa Xaa Xaa Xaa Xaa Xaa Xaa Xaa Xaa Xaa Xaa Xaa
2495 2500 2505

Xaa Xaa Xaa Xaa Xaa Xaa Xaa Xaa Xaa Xaa Xaa Xaa Xaa Xaa Xaa
2510 2515 2520

Xaa Xaa Xaa Xaa Xaa Xaa Xaa Xaa Xaa Xaa Xaa Xaa Xaa Xaa Xaa
2525 2530 2535

Xaa Xaa Xaa Xaa Xaa Xaa Xaa Xaa Xaa Xaa Xaa Xaa Xaa Xaa Xaa
2540 2545 2550

Xaa Xaa Xaa Xaa Xaa Xaa Xaa Xaa Xaa Xaa Xaa Xaa Xaa Xaa Xaa
2555 2560 2565

Xaa Xaa Xaa Xaa Xaa Xaa Xaa Xaa Xaa Xaa Xaa Xaa Xaa Xaa Xaa
2570 2575 2580

Xaa Xaa Xaa Xaa Xaa Xaa Xaa Xaa Xaa Xaa Xaa Xaa Xaa Xaa Xaa
2585 2590 2595

Xaa Xaa Xaa Xaa Xaa Xaa Xaa Xaa Xaa Xaa Xaa Xaa Xaa Xaa Xaa
2600 2605 2610

Xaa Xaa Xaa Xaa Xaa Xaa Xaa Xaa Xaa Xaa Xaa Xaa Xaa Xaa Xaa
2615 2620 2625

Xaa Xaa Xaa Xaa Xaa Xaa Xaa Xaa Xaa Xaa Xaa Xaa Xaa Xaa Xaa
2630 2635 2640

Xaa Xaa Xaa Xaa Xaa Xaa Xaa Xaa Xaa Xaa Xaa Xaa Xaa Xaa Xaa
2645 2650 2655

Xaa Xaa Xaa Xaa Xaa Xaa Xaa Xaa Xaa Xaa Xaa Xaa Xaa Xaa Xaa
2660 2665 2670

Xaa Xaa Xaa Xaa Xaa Xaa Xaa Xaa Xaa Xaa Xaa Xaa Xaa Xaa Xaa
2675 2680 2685

Xaa Xaa Xaa Xaa Xaa Xaa Xaa Xaa Xaa Xaa Xaa Xaa Xaa Xaa Xaa
2690 2695 2700

Xaa Xaa Xaa Xaa Xaa Xaa Xaa Xaa Xaa Xaa Xaa Xaa Xaa Xaa Xaa
2705 2710 2715

```
Xaa Xaa  Xaa Xaa Xaa Xaa Xaa  Xaa Xaa Xaa Xaa Xaa  Xaa Xaa Xaa
    2720                2725                2730

Xaa Xaa  Xaa Xaa Xaa Xaa Xaa  Xaa Xaa Xaa Xaa Xaa  Xaa Xaa Xaa
    2735                2740                2745

Xaa Xaa  Xaa Xaa Xaa Xaa Xaa  Xaa Xaa Xaa Xaa Xaa  Xaa Xaa Xaa
    2750                2755                2760

Xaa Xaa  Xaa Xaa Xaa Xaa Xaa  Xaa Xaa Xaa Xaa Xaa  Xaa Xaa Xaa
    2765                2770                2775

Xaa Xaa  Xaa Xaa Xaa Xaa Xaa  Xaa Xaa Xaa Xaa Xaa  Xaa Xaa Xaa
    2780                2785                2790

Xaa Xaa  Xaa Xaa Xaa Xaa Xaa  Xaa Xaa Xaa Xaa Xaa  Xaa Xaa Xaa
    2795                2800                2805

Xaa Xaa  Xaa Xaa Xaa Xaa Xaa  Xaa Xaa Xaa Xaa Xaa  Xaa Xaa Xaa
    2810                2815                2820

Xaa Xaa  Xaa Xaa Xaa Xaa Xaa  Xaa Xaa Xaa Xaa Xaa  Xaa Xaa Xaa
    2825                2830                2835

Xaa Xaa  Xaa Xaa Xaa Xaa Xaa  Xaa Xaa Xaa Xaa Xaa  Xaa Xaa Xaa
    2840                2845                2850

Xaa Xaa  Xaa Xaa Xaa Xaa Xaa  Xaa Xaa Xaa Xaa Xaa  Xaa Xaa Xaa
    2855                2860                2865

Xaa Xaa  Xaa Xaa Xaa Xaa Xaa  Xaa Xaa Xaa Xaa Xaa  Xaa Xaa Xaa
    2870                2875                2880

Xaa Xaa  Xaa Xaa Xaa Xaa Xaa  Xaa Xaa Xaa Xaa Xaa  Xaa Xaa Xaa
    2885                2890                2895

Xaa Xaa  Xaa Xaa Xaa Xaa Xaa  Xaa Xaa Xaa Xaa Xaa  Xaa Xaa Xaa
    2900                2905                2910

Xaa Xaa  Xaa Xaa Xaa Xaa Xaa  Xaa Xaa Xaa Xaa Xaa  Xaa Xaa Xaa
    2915                2920                2925

Xaa Xaa  Xaa Xaa Xaa Xaa Xaa  Xaa Xaa Xaa Xaa Xaa  Xaa Xaa Xaa
    2930                2935                2940

Xaa Xaa  Xaa Xaa Xaa Xaa Xaa  Xaa Xaa Xaa Xaa Xaa  Xaa Xaa Xaa
    2945                2950                2955

Xaa Xaa  Xaa Xaa Xaa Xaa Xaa  Xaa Xaa Xaa Xaa Xaa  Xaa Xaa Xaa
    2960                2965                2970

Xaa Xaa  Xaa Xaa Xaa Xaa Xaa  Xaa Xaa Xaa Xaa Xaa  Xaa Xaa Xaa
    2975                2980                2985

Xaa Xaa  Xaa Xaa Xaa Xaa Xaa  Xaa Xaa Xaa Xaa Xaa  Xaa Xaa Xaa
    2990                2995                3000

Xaa Xaa  Xaa Xaa Xaa Xaa Xaa  Xaa Xaa Xaa Xaa Xaa  Xaa Xaa Xaa
    3005                3010                3015

Xaa Xaa  Xaa Xaa Xaa Xaa Xaa  Xaa Xaa Xaa Xaa Xaa  Xaa Xaa Xaa
    3020                3025                3030

Xaa Xaa  Xaa Xaa Xaa Xaa Xaa  Xaa Xaa Xaa Xaa Xaa  Xaa Xaa Xaa
    3035                3040                3045

Xaa Xaa  Xaa Xaa Xaa Xaa Xaa  Xaa Xaa Xaa Xaa Xaa  Xaa Xaa Xaa
    3050                3055                3060

Xaa Xaa  Xaa Xaa Xaa Xaa Xaa  Xaa Xaa Xaa Xaa Xaa  Xaa Xaa Xaa
    3065                3070                3075

Xaa Xaa  Xaa Xaa Xaa Xaa Xaa  Xaa Xaa Xaa Xaa Xaa  Xaa Xaa Xaa
    3080                3085                3090

Xaa Xaa  Xaa Xaa Xaa Xaa Xaa  Xaa Xaa Xaa Xaa Xaa  Xaa Xaa Xaa
    3095                3100                3105

Xaa Xaa  Xaa Xaa Xaa Xaa Xaa  Xaa Xaa Xaa Xaa Xaa  Xaa Xaa Xaa
    3110                3115                3120
```

```
Xaa Xaa  Xaa Xaa Xaa Xaa Xaa  Xaa Xaa Xaa Xaa Xaa  Xaa Xaa Xaa
    3125                 3130                 3135

Xaa Xaa  Xaa Xaa Xaa Xaa Xaa  Xaa Xaa Xaa Xaa Xaa  Xaa Xaa Xaa
    3140                 3145                 3150

Xaa Xaa  Xaa Xaa Xaa Xaa Xaa  Xaa Xaa Xaa Xaa Xaa  Xaa Xaa Xaa
    3155                 3160                 3165

Xaa Xaa  Xaa Xaa Xaa Xaa Xaa  Xaa Xaa Xaa Xaa Xaa  Xaa Xaa Xaa
    3170                 3175                 3180

Xaa Xaa  Xaa Xaa Xaa Xaa Xaa  Xaa Xaa Xaa Xaa Xaa  Xaa Xaa Xaa
    3185                 3190                 3195

Xaa Xaa  Xaa Xaa Xaa Xaa Xaa  Xaa Xaa Xaa Xaa Xaa  Xaa Xaa Xaa
    3200                 3205                 3210

Xaa Xaa  Xaa Xaa Xaa Xaa Xaa  Xaa Xaa Xaa Xaa Xaa  Xaa Xaa Xaa
    3215                 3220                 3225

Xaa Xaa  Xaa Xaa Xaa Xaa Xaa  Xaa Xaa Xaa Xaa Xaa  Xaa Xaa Xaa
    3230                 3235                 3240

Xaa Xaa  Xaa Xaa Xaa Xaa Xaa  Xaa Xaa Xaa Xaa Xaa  Xaa Xaa Xaa
    3245                 3250                 3255

Xaa Xaa  Xaa Xaa Xaa Xaa Xaa  Xaa Xaa Xaa Xaa Xaa  Xaa Xaa Xaa
    3260                 3265                 3270

Xaa Xaa  Xaa Xaa Xaa Xaa Xaa  Xaa Xaa Xaa Xaa Xaa  Xaa Xaa Xaa
    3275                 3280                 3285

Xaa Xaa  Xaa Xaa Xaa Xaa Xaa  Xaa Xaa Xaa Xaa Xaa  Xaa Xaa Xaa
    3290                 3295                 3300

Xaa Xaa  Xaa Xaa Xaa Xaa Xaa  Xaa Xaa Xaa Xaa Xaa  Xaa Xaa Xaa
    3305                 3310                 3315

Xaa Xaa  Xaa Xaa Xaa Xaa Xaa  Xaa Xaa Xaa Xaa Xaa  Xaa Xaa Xaa
    3320                 3325                 3330

Xaa Xaa  Xaa Xaa Xaa Xaa Xaa  Xaa Xaa Xaa Xaa Xaa  Xaa Xaa Xaa
    3335                 3340                 3345

Xaa Xaa  Xaa Xaa Xaa Xaa Xaa  Xaa Xaa Xaa Xaa Xaa  Xaa Xaa Xaa
    3350                 3355                 3360

Xaa Xaa  Xaa Xaa Xaa Xaa Xaa  Xaa Xaa Xaa Xaa Xaa  Xaa Xaa Xaa
    3365                 3370                 3375

Xaa Xaa  Xaa Xaa Xaa Xaa Xaa  Xaa Xaa Xaa Xaa Xaa  Xaa Xaa Xaa
    3380                 3385                 3390

Xaa Xaa  Xaa Xaa Xaa Xaa Xaa  Xaa Xaa Xaa Xaa Xaa  Xaa Xaa Xaa
    3395                 3400                 3405

Xaa Xaa  Xaa Xaa Xaa Xaa Xaa  Xaa Xaa Xaa Xaa Xaa  Xaa Xaa Xaa
    3410                 3415                 3420

Xaa Xaa  Xaa Xaa Xaa Xaa Xaa  Xaa Xaa Xaa Xaa Xaa  Xaa Xaa Xaa
    3425                 3430                 3435

Xaa Xaa  Xaa Xaa Xaa Xaa Xaa  Xaa Xaa Xaa Xaa Xaa  Xaa Xaa Xaa
    3440                 3445                 3450

Xaa Xaa  Xaa Xaa Xaa Xaa Xaa  Xaa Xaa Xaa Xaa Xaa  Xaa Xaa Xaa
    3455                 3460                 3465

Xaa Xaa  Xaa Xaa Xaa Xaa Xaa  Xaa Xaa Xaa Xaa Xaa  Xaa Xaa Xaa
    3470                 3475                 3480

Xaa Xaa  Xaa Xaa Xaa Xaa Xaa  Xaa Xaa Xaa Xaa Xaa  Xaa Xaa Xaa
    3485                 3490                 3495

Xaa Xaa  Xaa Xaa Xaa Xaa Xaa  Xaa Xaa Xaa Xaa Xaa  Xaa Xaa Xaa
    3500                 3505                 3510

Xaa Xaa  Xaa Xaa Xaa Xaa Xaa  Xaa Xaa Xaa Xaa Xaa  Xaa Xaa Xaa
```

```
    3515                3520                3525

Xaa Xaa  Xaa Xaa Xaa Xaa Xaa  Xaa Xaa Xaa Xaa Xaa  Xaa Xaa Xaa
    3530                3535                3540

Xaa Xaa  Xaa Xaa Xaa Xaa Xaa  Xaa Xaa Xaa Xaa Xaa  Xaa Xaa Xaa
    3545                3550                3555

Xaa Xaa  Xaa Xaa Xaa Xaa Xaa  Xaa Xaa Xaa Xaa Xaa  Xaa Xaa Xaa
    3560                3565                3570

Xaa Xaa  Xaa Xaa Xaa Xaa Xaa  Xaa Xaa Xaa Xaa Xaa  Xaa Xaa Xaa
    3575                3580                3585

Xaa Xaa  Xaa Xaa Xaa Xaa Xaa  Xaa Xaa Xaa Xaa Xaa  Xaa Xaa Xaa
    3590                3595                3600

Xaa Xaa  Xaa Xaa Xaa Xaa Xaa  Xaa Xaa Xaa Xaa Xaa  Xaa Xaa Xaa
    3605                3610                3615

Xaa Xaa  Xaa Xaa Xaa Xaa Xaa  Xaa Xaa Xaa Xaa Xaa  Xaa Xaa Xaa
    3620                3625                3630

Xaa Xaa  Xaa Xaa Xaa Xaa Xaa  Xaa Xaa Xaa Xaa Xaa  Xaa Xaa Xaa
    3635                3640                3645

Xaa Xaa  Xaa Xaa Xaa Xaa Xaa  Xaa Xaa Xaa Xaa Xaa  Xaa Xaa Xaa
    3650                3655                3660

Xaa Xaa  Xaa Xaa Xaa Xaa Xaa  Xaa Xaa Xaa Xaa Xaa  Xaa Xaa Xaa
    3665                3670                3675

Xaa Xaa  Xaa Xaa Xaa Xaa Xaa  Xaa Xaa Xaa Xaa Xaa  Xaa Xaa Xaa
    3680                3685                3690

Xaa Xaa  Xaa Xaa Xaa Xaa Xaa  Xaa Xaa Xaa Xaa Xaa  Xaa Xaa Xaa
    3695                3700                3705

Xaa Xaa  Xaa Xaa Xaa Xaa Xaa  Xaa Xaa Xaa Xaa Xaa  Xaa Xaa Xaa
    3710                3715                3720

Xaa Xaa  Xaa Xaa Xaa Xaa Xaa  Xaa Xaa Xaa Xaa Xaa  Xaa Xaa Xaa
    3725                3730                3735

Xaa Xaa  Xaa Xaa Xaa Xaa Xaa  Xaa Xaa Xaa Xaa Xaa  Xaa Xaa Xaa
    3740                3745                3750

Xaa Xaa  Xaa Xaa Xaa Xaa Xaa  Xaa Xaa Xaa Xaa Xaa  Xaa Xaa Xaa
    3755                3760                3765

Xaa Xaa  Xaa Xaa Xaa Xaa Xaa  Xaa Xaa Xaa Xaa Xaa  Xaa Xaa Xaa
    3770                3775                3780

Xaa Xaa  Xaa Xaa Xaa Xaa Xaa  Xaa Xaa Xaa Xaa Xaa  Xaa Xaa Xaa
    3785                3790                3795

Xaa Xaa  Xaa Xaa Xaa Xaa Xaa  Xaa Xaa Xaa Xaa Xaa  Xaa Xaa Xaa
    3800                3805                3810

Xaa Xaa  Xaa Xaa Xaa Xaa Xaa  Xaa Xaa Xaa Xaa Xaa  Xaa Xaa Xaa
    3815                3820                3825

Xaa Xaa  Xaa Xaa Xaa Xaa Xaa  Xaa Xaa Xaa Xaa Xaa  Xaa Xaa Xaa
    3830                3835                3840

Xaa Xaa  Xaa Xaa Xaa Xaa Xaa  Xaa Xaa Xaa Xaa Xaa  Xaa Xaa Xaa
    3845                3850                3855

Xaa Xaa  Xaa Xaa Xaa Xaa Xaa  Xaa Xaa Xaa Xaa Xaa  Xaa Xaa Xaa
    3860                3865                3870

Xaa Xaa  Xaa Xaa Xaa Xaa Xaa  Xaa Xaa Xaa Xaa Xaa  Xaa Xaa Xaa
    3875                3880                3885

Xaa Xaa  Xaa Xaa Xaa Xaa Xaa  Xaa Xaa Xaa Xaa Xaa  Xaa Xaa Xaa
    3890                3895                3900

Xaa Xaa  Xaa Xaa Xaa Xaa Xaa  Xaa Xaa Xaa Xaa Xaa  Xaa Xaa Xaa
    3905                3910                3915
```

```
Xaa Xaa  Xaa Xaa Xaa Xaa Xaa  Xaa Xaa Xaa Xaa Xaa  Xaa Xaa Xaa
    3920                 3925                 3930

Xaa Xaa  Xaa Xaa Xaa Xaa Xaa  Xaa Xaa Xaa Xaa Xaa  Xaa Xaa Xaa
    3935                 3940                 3945

Xaa Xaa  Xaa Xaa Xaa Xaa Xaa  Xaa Xaa Xaa Xaa Xaa  Xaa Xaa Xaa
    3950                 3955                 3960

Xaa Xaa  Xaa Xaa Xaa Xaa Xaa  Xaa Xaa Xaa Xaa Xaa  Xaa Xaa Xaa
    3965                 3970                 3975

Xaa Xaa  Xaa Xaa Xaa Xaa Xaa  Xaa Xaa Xaa Xaa Xaa  Xaa Xaa Xaa
    3980                 3985                 3990

Xaa Xaa  Xaa Xaa Xaa Xaa Xaa  Xaa Xaa Xaa Xaa Xaa  Xaa Xaa Xaa
    3995                 4000                 4005

Xaa Xaa  Xaa Xaa Xaa Xaa Xaa  Xaa Xaa Xaa Xaa Xaa  Xaa Xaa Xaa
    4010                 4015                 4020

Xaa Xaa  Xaa Xaa Xaa Xaa Xaa  Xaa Xaa Xaa Xaa Xaa  Xaa Xaa Xaa
    4025                 4030                 4035

Xaa Xaa  Xaa Xaa Xaa Xaa Xaa  Xaa Xaa Xaa Xaa Xaa  Xaa Xaa Xaa
    4040                 4045                 4050

Xaa Xaa  Xaa Xaa Xaa Xaa Xaa  Xaa Xaa Xaa Xaa Xaa  Xaa Xaa Xaa
    4055                 4060                 4065

Xaa Xaa  Xaa Xaa Xaa Xaa Xaa  Xaa Xaa Xaa Xaa Xaa  Xaa Xaa Xaa
    4070                 4075                 4080

Xaa Xaa  Xaa Xaa Xaa Xaa Xaa  Xaa Xaa Xaa Xaa Xaa  Xaa Xaa Xaa
    4085                 4090                 4095

Xaa Xaa  Xaa Xaa Xaa Xaa Xaa  Xaa
    4100                 4105
```

<210> SEQ ID NO 2
<211> LENGTH: 4367
<212> TYPE: PRT
<213> ORGANISM: Artificial Sequence
<220> FEATURE:
<223> OTHER INFORMATION: Hydrophobin
<220> FEATURE:
<221> NAME/KEY: MISC_FEATURE
<222> LOCATION: (1)..(2000)
<223> OTHER INFORMATION: Xaa may be any amino acid; One or more Xaa may be missing
<220> FEATURE:
<221> NAME/KEY: MISC_FEATURE
<222> LOCATION: (2002)..(2002)
<223> OTHER INFORMATION: Xaa may be any amino acid;
<220> FEATURE:
<221> NAME/KEY: MISC_FEATURE
<222> LOCATION: (2003)..(2051)
<223> OTHER INFORMATION: Xaa may be any amino acid; One or more Xaa may be missing
<220> FEATURE:
<221> NAME/KEY: MISC_FEATURE
<222> LOCATION: (2053)..(2057)
<223> OTHER INFORMATION: Xaa may be any amino acid; One or more Xaa may be missing
<220> FEATURE:
<221> NAME/KEY: MISC_FEATURE
<222> LOCATION: (2059)..(2059)
<223> OTHER INFORMATION: Xaa may be any amino acid;
<220> FEATURE:
<221> NAME/KEY: MISC_FEATURE
<222> LOCATION: (2060)..(2158)
<223> OTHER INFORMATION: Xaa may be any amino acid; One or more Xaa may be missing
<220> FEATURE:
<221> NAME/KEY: MISC_FEATURE
<222> LOCATION: (2160)..(2160)
<223> OTHER INFORMATION: Xaa may be any amino acid;
<220> FEATURE:
<221> NAME/KEY: MISC_FEATURE

```
<222> LOCATION: (2161)..(2259)
<223> OTHER INFORMATION: Xaa may be any amino acid; One or more Xaa
      may be missing
<220> FEATURE:
<221> NAME/KEY: MISC_FEATURE
<222> LOCATION: (2260)..(2260)
<223> OTHER INFORMATION: Xaa may be any amino acid;
<220> FEATURE:
<221> NAME/KEY: MISC_FEATURE
<222> LOCATION: (2261)..(2309)
<223> OTHER INFORMATION: Xaa may be any amino acid; One or more Xaa
      may be missing.
<220> FEATURE:
<221> NAME/KEY: MISC_FEATURE
<222> LOCATION: (2311)..(2315)
<223> OTHER INFORMATION: Xaa may be any amino acid; One or more Xaa
      may be missing.
<220> FEATURE:
<221> NAME/KEY: MISC_FEATURE
<222> LOCATION: (2317)..(2317)
<223> OTHER INFORMATION: Xaa may be any amino acid;
<220> FEATURE:
<221> NAME/KEY: MISC_FEATURE
<222> LOCATION: (2318)..(2366)
<223> OTHER INFORMATION: Xaa may be any amino acid; One or more Xaa
      may be missing.
<220> FEATURE:
<221> NAME/KEY: MISC_FEATURE
<222> LOCATION: (2368)..(4367)
<223> OTHER INFORMATION: Xaa may be any amino acid; One or more Xaa
      may be missing.

<400> SEQUENCE: 2

Xaa Xaa Xaa Xaa Xaa Xaa Xaa Xaa Xaa Xaa Xaa Xaa Xaa Xaa Xaa Xaa
1               5                   10                  15

Xaa Xaa Xaa Xaa Xaa Xaa Xaa Xaa Xaa Xaa Xaa Xaa Xaa Xaa Xaa Xaa
            20                  25                  30

Xaa Xaa Xaa Xaa Xaa Xaa Xaa Xaa Xaa Xaa Xaa Xaa Xaa Xaa Xaa Xaa
        35                  40                  45

Xaa Xaa Xaa Xaa Xaa Xaa Xaa Xaa Xaa Xaa Xaa Xaa Xaa Xaa Xaa Xaa
    50                  55                  60

Xaa Xaa Xaa Xaa Xaa Xaa Xaa Xaa Xaa Xaa Xaa Xaa Xaa Xaa Xaa Xaa
65                  70                  75                  80

Xaa Xaa Xaa Xaa Xaa Xaa Xaa Xaa Xaa Xaa Xaa Xaa Xaa Xaa Xaa Xaa
                85                  90                  95

Xaa Xaa Xaa Xaa Xaa Xaa Xaa Xaa Xaa Xaa Xaa Xaa Xaa Xaa Xaa Xaa
            100                 105                 110

Xaa Xaa Xaa Xaa Xaa Xaa Xaa Xaa Xaa Xaa Xaa Xaa Xaa Xaa Xaa Xaa
        115                 120                 125

Xaa Xaa Xaa Xaa Xaa Xaa Xaa Xaa Xaa Xaa Xaa Xaa Xaa Xaa Xaa Xaa
    130                 135                 140

Xaa Xaa Xaa Xaa Xaa Xaa Xaa Xaa Xaa Xaa Xaa Xaa Xaa Xaa Xaa Xaa
145                 150                 155                 160

Xaa Xaa Xaa Xaa Xaa Xaa Xaa Xaa Xaa Xaa Xaa Xaa Xaa Xaa Xaa Xaa
                165                 170                 175

Xaa Xaa Xaa Xaa Xaa Xaa Xaa Xaa Xaa Xaa Xaa Xaa Xaa Xaa Xaa Xaa
            180                 185                 190

Xaa Xaa Xaa Xaa Xaa Xaa Xaa Xaa Xaa Xaa Xaa Xaa Xaa Xaa Xaa Xaa
        195                 200                 205

Xaa Xaa Xaa Xaa Xaa Xaa Xaa Xaa Xaa Xaa Xaa Xaa Xaa Xaa Xaa Xaa
    210                 215                 220

Xaa Xaa Xaa Xaa Xaa Xaa Xaa Xaa Xaa Xaa Xaa Xaa Xaa Xaa Xaa Xaa
225                 230                 235                 240

Xaa Xaa Xaa Xaa Xaa Xaa Xaa Xaa Xaa Xaa Xaa Xaa Xaa Xaa Xaa Xaa
```

-continued

```
                245                 250                 255

Xaa Xaa Xaa Xaa Xaa Xaa Xaa Xaa Xaa Xaa Xaa Xaa Xaa Xaa Xaa Xaa
            260                 265                 270

Xaa Xaa Xaa Xaa Xaa Xaa Xaa Xaa Xaa Xaa Xaa Xaa Xaa Xaa Xaa Xaa
        275                 280                 285

Xaa Xaa Xaa Xaa Xaa Xaa Xaa Xaa Xaa Xaa Xaa Xaa Xaa Xaa Xaa Xaa
    290                 295                 300

Xaa Xaa Xaa Xaa Xaa Xaa Xaa Xaa Xaa Xaa Xaa Xaa Xaa Xaa Xaa Xaa
305                 310                 315                 320

Xaa Xaa Xaa Xaa Xaa Xaa Xaa Xaa Xaa Xaa Xaa Xaa Xaa Xaa Xaa Xaa
                325                 330                 335

Xaa Xaa Xaa Xaa Xaa Xaa Xaa Xaa Xaa Xaa Xaa Xaa Xaa Xaa Xaa Xaa
            340                 345                 350

Xaa Xaa Xaa Xaa Xaa Xaa Xaa Xaa Xaa Xaa Xaa Xaa Xaa Xaa Xaa Xaa
        355                 360                 365

Xaa Xaa Xaa Xaa Xaa Xaa Xaa Xaa Xaa Xaa Xaa Xaa Xaa Xaa Xaa Xaa
    370                 375                 380

Xaa Xaa Xaa Xaa Xaa Xaa Xaa Xaa Xaa Xaa Xaa Xaa Xaa Xaa Xaa Xaa
385                 390                 395                 400

Xaa Xaa Xaa Xaa Xaa Xaa Xaa Xaa Xaa Xaa Xaa Xaa Xaa Xaa Xaa Xaa
                405                 410                 415

Xaa Xaa Xaa Xaa Xaa Xaa Xaa Xaa Xaa Xaa Xaa Xaa Xaa Xaa Xaa Xaa
            420                 425                 430

Xaa Xaa Xaa Xaa Xaa Xaa Xaa Xaa Xaa Xaa Xaa Xaa Xaa Xaa Xaa Xaa
        435                 440                 445

Xaa Xaa Xaa Xaa Xaa Xaa Xaa Xaa Xaa Xaa Xaa Xaa Xaa Xaa Xaa Xaa
    450                 455                 460

Xaa Xaa Xaa Xaa Xaa Xaa Xaa Xaa Xaa Xaa Xaa Xaa Xaa Xaa Xaa Xaa
465                 470                 475                 480

Xaa Xaa Xaa Xaa Xaa Xaa Xaa Xaa Xaa Xaa Xaa Xaa Xaa Xaa Xaa Xaa
                485                 490                 495

Xaa Xaa Xaa Xaa Xaa Xaa Xaa Xaa Xaa Xaa Xaa Xaa Xaa Xaa Xaa Xaa
            500                 505                 510

Xaa Xaa Xaa Xaa Xaa Xaa Xaa Xaa Xaa Xaa Xaa Xaa Xaa Xaa Xaa Xaa
        515                 520                 525

Xaa Xaa Xaa Xaa Xaa Xaa Xaa Xaa Xaa Xaa Xaa Xaa Xaa Xaa Xaa Xaa
    530                 535                 540

Xaa Xaa Xaa Xaa Xaa Xaa Xaa Xaa Xaa Xaa Xaa Xaa Xaa Xaa Xaa Xaa
545                 550                 555                 560

Xaa Xaa Xaa Xaa Xaa Xaa Xaa Xaa Xaa Xaa Xaa Xaa Xaa Xaa Xaa Xaa
                565                 570                 575

Xaa Xaa Xaa Xaa Xaa Xaa Xaa Xaa Xaa Xaa Xaa Xaa Xaa Xaa Xaa Xaa
            580                 585                 590

Xaa Xaa Xaa Xaa Xaa Xaa Xaa Xaa Xaa Xaa Xaa Xaa Xaa Xaa Xaa Xaa
        595                 600                 605

Xaa Xaa Xaa Xaa Xaa Xaa Xaa Xaa Xaa Xaa Xaa Xaa Xaa Xaa Xaa Xaa
    610                 615                 620

Xaa Xaa Xaa Xaa Xaa Xaa Xaa Xaa Xaa Xaa Xaa Xaa Xaa Xaa Xaa Xaa
625                 630                 635                 640

Xaa Xaa Xaa Xaa Xaa Xaa Xaa Xaa Xaa Xaa Xaa Xaa Xaa Xaa Xaa Xaa
                645                 650                 655

Xaa Xaa Xaa Xaa Xaa Xaa Xaa Xaa Xaa Xaa Xaa Xaa Xaa Xaa Xaa Xaa
            660                 665                 670
```

-continued

```
Xaa Xaa Xaa Xaa Xaa Xaa Xaa Xaa Xaa Xaa Xaa Xaa Xaa Xaa Xaa Xaa
        675                 680                 685

Xaa Xaa Xaa Xaa Xaa Xaa Xaa Xaa Xaa Xaa Xaa Xaa Xaa Xaa Xaa Xaa
    690                 695                 700

Xaa Xaa Xaa Xaa Xaa Xaa Xaa Xaa Xaa Xaa Xaa Xaa Xaa Xaa Xaa Xaa
705                 710                 715                 720

Xaa Xaa Xaa Xaa Xaa Xaa Xaa Xaa Xaa Xaa Xaa Xaa Xaa Xaa Xaa Xaa
                725                 730                 735

Xaa Xaa Xaa Xaa Xaa Xaa Xaa Xaa Xaa Xaa Xaa Xaa Xaa Xaa Xaa Xaa
            740                 745                 750

Xaa Xaa Xaa Xaa Xaa Xaa Xaa Xaa Xaa Xaa Xaa Xaa Xaa Xaa Xaa Xaa
        755                 760                 765

Xaa Xaa Xaa Xaa Xaa Xaa Xaa Xaa Xaa Xaa Xaa Xaa Xaa Xaa Xaa Xaa
    770                 775                 780

Xaa Xaa Xaa Xaa Xaa Xaa Xaa Xaa Xaa Xaa Xaa Xaa Xaa Xaa Xaa Xaa
785                 790                 795                 800

Xaa Xaa Xaa Xaa Xaa Xaa Xaa Xaa Xaa Xaa Xaa Xaa Xaa Xaa Xaa Xaa
                805                 810                 815

Xaa Xaa Xaa Xaa Xaa Xaa Xaa Xaa Xaa Xaa Xaa Xaa Xaa Xaa Xaa Xaa
            820                 825                 830

Xaa Xaa Xaa Xaa Xaa Xaa Xaa Xaa Xaa Xaa Xaa Xaa Xaa Xaa Xaa Xaa
        835                 840                 845

Xaa Xaa Xaa Xaa Xaa Xaa Xaa Xaa Xaa Xaa Xaa Xaa Xaa Xaa Xaa Xaa
    850                 855                 860

Xaa Xaa Xaa Xaa Xaa Xaa Xaa Xaa Xaa Xaa Xaa Xaa Xaa Xaa Xaa Xaa
865                 870                 875                 880

Xaa Xaa Xaa Xaa Xaa Xaa Xaa Xaa Xaa Xaa Xaa Xaa Xaa Xaa Xaa Xaa
                885                 890                 895

Xaa Xaa Xaa Xaa Xaa Xaa Xaa Xaa Xaa Xaa Xaa Xaa Xaa Xaa Xaa Xaa
            900                 905                 910

Xaa Xaa Xaa Xaa Xaa Xaa Xaa Xaa Xaa Xaa Xaa Xaa Xaa Xaa Xaa Xaa
        915                 920                 925

Xaa Xaa Xaa Xaa Xaa Xaa Xaa Xaa Xaa Xaa Xaa Xaa Xaa Xaa Xaa Xaa
    930                 935                 940

Xaa Xaa Xaa Xaa Xaa Xaa Xaa Xaa Xaa Xaa Xaa Xaa Xaa Xaa Xaa Xaa
945                 950                 955                 960

Xaa Xaa Xaa Xaa Xaa Xaa Xaa Xaa Xaa Xaa Xaa Xaa Xaa Xaa Xaa Xaa
                965                 970                 975

Xaa Xaa Xaa Xaa Xaa Xaa Xaa Xaa Xaa Xaa Xaa Xaa Xaa Xaa Xaa Xaa
            980                 985                 990

Xaa Xaa Xaa Xaa Xaa Xaa Xaa Xaa  Xaa Xaa Xaa Xaa Xaa  Xaa Xaa Xaa
        995                 1000                 1005

Xaa Xaa  Xaa Xaa Xaa Xaa Xaa  Xaa Xaa Xaa Xaa Xaa  Xaa Xaa Xaa
    1010                 1015                 1020

Xaa Xaa  Xaa Xaa Xaa Xaa Xaa  Xaa Xaa Xaa Xaa Xaa  Xaa Xaa Xaa
    1025                 1030                 1035

Xaa Xaa  Xaa Xaa Xaa Xaa Xaa  Xaa Xaa Xaa Xaa Xaa  Xaa Xaa Xaa
    1040                 1045                 1050

Xaa Xaa  Xaa Xaa Xaa Xaa Xaa  Xaa Xaa Xaa Xaa Xaa  Xaa Xaa Xaa
    1055                 1060                 1065

Xaa Xaa  Xaa Xaa Xaa Xaa Xaa  Xaa Xaa Xaa Xaa Xaa  Xaa Xaa Xaa
    1070                 1075                 1080

Xaa Xaa  Xaa Xaa Xaa Xaa Xaa  Xaa Xaa Xaa Xaa Xaa  Xaa Xaa Xaa
    1085                 1090                 1095
```

```
Xaa Xaa  Xaa Xaa Xaa Xaa Xaa  Xaa Xaa Xaa Xaa Xaa  Xaa Xaa Xaa
    1100                 1105                 1110

Xaa Xaa  Xaa Xaa Xaa Xaa Xaa  Xaa Xaa Xaa Xaa Xaa  Xaa Xaa Xaa
    1115                 1120                 1125

Xaa Xaa  Xaa Xaa Xaa Xaa Xaa  Xaa Xaa Xaa Xaa Xaa  Xaa Xaa Xaa
    1130                 1135                 1140

Xaa Xaa  Xaa Xaa Xaa Xaa Xaa  Xaa Xaa Xaa Xaa Xaa  Xaa Xaa Xaa
    1145                 1150                 1155

Xaa Xaa  Xaa Xaa Xaa Xaa Xaa  Xaa Xaa Xaa Xaa Xaa  Xaa Xaa Xaa
    1160                 1165                 1170

Xaa Xaa  Xaa Xaa Xaa Xaa Xaa  Xaa Xaa Xaa Xaa Xaa  Xaa Xaa Xaa
    1175                 1180                 1185

Xaa Xaa  Xaa Xaa Xaa Xaa Xaa  Xaa Xaa Xaa Xaa Xaa  Xaa Xaa Xaa
    1190                 1195                 1200

Xaa Xaa  Xaa Xaa Xaa Xaa Xaa  Xaa Xaa Xaa Xaa Xaa  Xaa Xaa Xaa
    1205                 1210                 1215

Xaa Xaa  Xaa Xaa Xaa Xaa Xaa  Xaa Xaa Xaa Xaa Xaa  Xaa Xaa Xaa
    1220                 1225                 1230

Xaa Xaa  Xaa Xaa Xaa Xaa Xaa  Xaa Xaa Xaa Xaa Xaa  Xaa Xaa Xaa
    1235                 1240                 1245

Xaa Xaa  Xaa Xaa Xaa Xaa Xaa  Xaa Xaa Xaa Xaa Xaa  Xaa Xaa Xaa
    1250                 1255                 1260

Xaa Xaa  Xaa Xaa Xaa Xaa Xaa  Xaa Xaa Xaa Xaa Xaa  Xaa Xaa Xaa
    1265                 1270                 1275

Xaa Xaa  Xaa Xaa Xaa Xaa Xaa  Xaa Xaa Xaa Xaa Xaa  Xaa Xaa Xaa
    1280                 1285                 1290

Xaa Xaa  Xaa Xaa Xaa Xaa Xaa  Xaa Xaa Xaa Xaa Xaa  Xaa Xaa Xaa
    1295                 1300                 1305

Xaa Xaa  Xaa Xaa Xaa Xaa Xaa  Xaa Xaa Xaa Xaa Xaa  Xaa Xaa Xaa
    1310                 1315                 1320

Xaa Xaa  Xaa Xaa Xaa Xaa Xaa  Xaa Xaa Xaa Xaa Xaa  Xaa Xaa Xaa
    1325                 1330                 1335

Xaa Xaa  Xaa Xaa Xaa Xaa Xaa  Xaa Xaa Xaa Xaa Xaa  Xaa Xaa Xaa
    1340                 1345                 1350

Xaa Xaa  Xaa Xaa Xaa Xaa Xaa  Xaa Xaa Xaa Xaa Xaa  Xaa Xaa Xaa
    1355                 1360                 1365

Xaa Xaa  Xaa Xaa Xaa Xaa Xaa  Xaa Xaa Xaa Xaa Xaa  Xaa Xaa Xaa
    1370                 1375                 1380

Xaa Xaa  Xaa Xaa Xaa Xaa Xaa  Xaa Xaa Xaa Xaa Xaa  Xaa Xaa Xaa
    1385                 1390                 1395

Xaa Xaa  Xaa Xaa Xaa Xaa Xaa  Xaa Xaa Xaa Xaa Xaa  Xaa Xaa Xaa
    1400                 1405                 1410

Xaa Xaa  Xaa Xaa Xaa Xaa Xaa  Xaa Xaa Xaa Xaa Xaa  Xaa Xaa Xaa
    1415                 1420                 1425

Xaa Xaa  Xaa Xaa Xaa Xaa Xaa  Xaa Xaa Xaa Xaa Xaa  Xaa Xaa Xaa
    1430                 1435                 1440

Xaa Xaa  Xaa Xaa Xaa Xaa Xaa  Xaa Xaa Xaa Xaa Xaa  Xaa Xaa Xaa
    1445                 1450                 1455

Xaa Xaa  Xaa Xaa Xaa Xaa Xaa  Xaa Xaa Xaa Xaa Xaa  Xaa Xaa Xaa
    1460                 1465                 1470

Xaa Xaa  Xaa Xaa Xaa Xaa Xaa  Xaa Xaa Xaa Xaa Xaa  Xaa Xaa Xaa
    1475                 1480                 1485

Xaa Xaa  Xaa Xaa Xaa Xaa Xaa  Xaa Xaa Xaa Xaa Xaa  Xaa Xaa Xaa
```

```
    1490                1495                1500

Xaa Xaa  Xaa Xaa Xaa Xaa Xaa  Xaa Xaa Xaa Xaa Xaa  Xaa Xaa Xaa
    1505                1510                1515

Xaa Xaa  Xaa Xaa Xaa Xaa Xaa  Xaa Xaa Xaa Xaa Xaa  Xaa Xaa Xaa
    1520                1525                1530

Xaa Xaa  Xaa Xaa Xaa Xaa Xaa  Xaa Xaa Xaa Xaa Xaa  Xaa Xaa Xaa
    1535                1540                1545

Xaa Xaa  Xaa Xaa Xaa Xaa Xaa  Xaa Xaa Xaa Xaa Xaa  Xaa Xaa Xaa
    1550                1555                1560

Xaa Xaa  Xaa Xaa Xaa Xaa Xaa  Xaa Xaa Xaa Xaa Xaa  Xaa Xaa Xaa
    1565                1570                1575

Xaa Xaa  Xaa Xaa Xaa Xaa Xaa  Xaa Xaa Xaa Xaa Xaa  Xaa Xaa Xaa
    1580                1585                1590

Xaa Xaa  Xaa Xaa Xaa Xaa Xaa  Xaa Xaa Xaa Xaa Xaa  Xaa Xaa Xaa
    1595                1600                1605

Xaa Xaa  Xaa Xaa Xaa Xaa Xaa  Xaa Xaa Xaa Xaa Xaa  Xaa Xaa Xaa
    1610                1615                1620

Xaa Xaa  Xaa Xaa Xaa Xaa Xaa  Xaa Xaa Xaa Xaa Xaa  Xaa Xaa Xaa
    1625                1630                1635

Xaa Xaa  Xaa Xaa Xaa Xaa Xaa  Xaa Xaa Xaa Xaa Xaa  Xaa Xaa Xaa
    1640                1645                1650

Xaa Xaa  Xaa Xaa Xaa Xaa Xaa  Xaa Xaa Xaa Xaa Xaa  Xaa Xaa Xaa
    1655                1660                1665

Xaa Xaa  Xaa Xaa Xaa Xaa Xaa  Xaa Xaa Xaa Xaa Xaa  Xaa Xaa Xaa
    1670                1675                1680

Xaa Xaa  Xaa Xaa Xaa Xaa Xaa  Xaa Xaa Xaa Xaa Xaa  Xaa Xaa Xaa
    1685                1690                1695

Xaa Xaa  Xaa Xaa Xaa Xaa Xaa  Xaa Xaa Xaa Xaa Xaa  Xaa Xaa Xaa
    1700                1705                1710

Xaa Xaa  Xaa Xaa Xaa Xaa Xaa  Xaa Xaa Xaa Xaa Xaa  Xaa Xaa Xaa
    1715                1720                1725

Xaa Xaa  Xaa Xaa Xaa Xaa Xaa  Xaa Xaa Xaa Xaa Xaa  Xaa Xaa Xaa
    1730                1735                1740

Xaa Xaa  Xaa Xaa Xaa Xaa Xaa  Xaa Xaa Xaa Xaa Xaa  Xaa Xaa Xaa
    1745                1750                1755

Xaa Xaa  Xaa Xaa Xaa Xaa Xaa  Xaa Xaa Xaa Xaa Xaa  Xaa Xaa Xaa
    1760                1765                1770

Xaa Xaa  Xaa Xaa Xaa Xaa Xaa  Xaa Xaa Xaa Xaa Xaa  Xaa Xaa Xaa
    1775                1780                1785

Xaa Xaa  Xaa Xaa Xaa Xaa Xaa  Xaa Xaa Xaa Xaa Xaa  Xaa Xaa Xaa
    1790                1795                1800

Xaa Xaa  Xaa Xaa Xaa Xaa Xaa  Xaa Xaa Xaa Xaa Xaa  Xaa Xaa Xaa
    1805                1810                1815

Xaa Xaa  Xaa Xaa Xaa Xaa Xaa  Xaa Xaa Xaa Xaa Xaa  Xaa Xaa Xaa
    1820                1825                1830

Xaa Xaa  Xaa Xaa Xaa Xaa Xaa  Xaa Xaa Xaa Xaa Xaa  Xaa Xaa Xaa
    1835                1840                1845

Xaa Xaa  Xaa Xaa Xaa Xaa Xaa  Xaa Xaa Xaa Xaa Xaa  Xaa Xaa Xaa
    1850                1855                1860

Xaa Xaa  Xaa Xaa Xaa Xaa Xaa  Xaa Xaa Xaa Xaa Xaa  Xaa Xaa Xaa
    1865                1870                1875

Xaa Xaa  Xaa Xaa Xaa Xaa Xaa  Xaa Xaa Xaa Xaa Xaa  Xaa Xaa Xaa
    1880                1885                1890
```

```
Xaa Xaa  Xaa Xaa Xaa Xaa Xaa  Xaa Xaa Xaa Xaa Xaa  Xaa Xaa Xaa
    1895                 1900                 1905

Xaa Xaa  Xaa Xaa Xaa Xaa Xaa  Xaa Xaa Xaa Xaa Xaa  Xaa Xaa Xaa
    1910                 1915                 1920

Xaa Xaa  Xaa Xaa Xaa Xaa Xaa  Xaa Xaa Xaa Xaa Xaa  Xaa Xaa Xaa
    1925                 1930                 1935

Xaa Xaa  Xaa Xaa Xaa Xaa Xaa  Xaa Xaa Xaa Xaa Xaa  Xaa Xaa Xaa
    1940                 1945                 1950

Xaa Xaa  Xaa Xaa Xaa Xaa Xaa  Xaa Xaa Xaa Xaa Xaa  Xaa Xaa Xaa
    1955                 1960                 1965

Xaa Xaa  Xaa Xaa Xaa Xaa Xaa  Xaa Xaa Xaa Xaa Xaa  Xaa Xaa Xaa
    1970                 1975                 1980

Xaa Xaa  Xaa Xaa Xaa Xaa Xaa  Xaa Xaa Xaa Xaa Xaa  Xaa Xaa Xaa
    1985                 1990                 1995

Xaa Xaa  Cys Xaa Xaa Xaa Xaa  Xaa Xaa Xaa Xaa Xaa  Xaa Xaa Xaa
    2000                 2005                 2010

Xaa Xaa  Xaa Xaa Xaa Xaa Xaa  Xaa Xaa Xaa Xaa Xaa  Xaa Xaa Xaa
    2015                 2020                 2025

Xaa Xaa  Xaa Xaa Xaa Xaa Xaa  Xaa Xaa Xaa Xaa Xaa  Xaa Xaa Xaa
    2030                 2035                 2040

Xaa Xaa  Xaa Xaa Xaa Xaa Xaa  Xaa Cys Xaa Xaa Xaa  Xaa Xaa Cys
    2045                 2050                 2055

Xaa Xaa  Xaa Xaa Xaa Xaa Xaa  Xaa Xaa Xaa Xaa Xaa  Xaa Xaa Xaa
    2060                 2065                 2070

Xaa Xaa  Xaa Xaa Xaa Xaa Xaa  Xaa Xaa Xaa Xaa Xaa  Xaa Xaa Xaa
    2075                 2080                 2085

Xaa Xaa  Xaa Xaa Xaa Xaa Xaa  Xaa Xaa Xaa Xaa Xaa  Xaa Xaa Xaa
    2090                 2095                 2100

Xaa Xaa  Xaa Xaa Xaa Xaa Xaa  Xaa Xaa Xaa Xaa Xaa  Xaa Xaa Xaa
    2105                 2110                 2115

Xaa Xaa  Xaa Xaa Xaa Xaa Xaa  Xaa Xaa Xaa Xaa Xaa  Xaa Xaa Xaa
    2120                 2125                 2130

Xaa Xaa  Xaa Xaa Xaa Xaa Xaa  Xaa Xaa Xaa Xaa Xaa  Xaa Xaa Xaa
    2135                 2140                 2145

Xaa Xaa  Xaa Xaa Xaa Xaa Xaa  Xaa Xaa Xaa Cys Xaa  Xaa Xaa Xaa
    2150                 2155                 2160

Xaa Xaa  Xaa Xaa Xaa Xaa Xaa  Xaa Xaa Xaa Xaa Xaa  Xaa Xaa Xaa
    2165                 2170                 2175

Xaa Xaa  Xaa Xaa Xaa Xaa Xaa  Xaa Xaa Xaa Xaa Xaa  Xaa Xaa Xaa
    2180                 2185                 2190

Xaa Xaa  Xaa Xaa Xaa Xaa Xaa  Xaa Xaa Xaa Xaa Xaa  Xaa Xaa Xaa
    2195                 2200                 2205

Xaa Xaa  Xaa Xaa Xaa Xaa Xaa  Xaa Xaa Xaa Xaa Xaa  Xaa Xaa Xaa
    2210                 2215                 2220

Xaa Xaa  Xaa Xaa Xaa Xaa Xaa  Xaa Xaa Xaa Xaa Xaa  Xaa Xaa Xaa
    2225                 2230                 2235

Xaa Xaa  Xaa Xaa Xaa Xaa Xaa  Xaa Xaa Xaa Xaa Xaa  Xaa Xaa Xaa
    2240                 2245                 2250

Xaa Xaa  Xaa Xaa Xaa Xaa Xaa  Xaa Xaa Xaa Xaa Xaa  Xaa Xaa Xaa
    2255                 2260                 2265

Xaa Xaa  Xaa Xaa Xaa Xaa Xaa  Xaa Xaa Xaa Xaa Xaa  Xaa Xaa Xaa
    2270                 2275                 2280

Xaa Xaa  Xaa Xaa Xaa Xaa Xaa  Xaa Xaa Xaa Xaa Xaa  Xaa Xaa Xaa
    2285                 2290                 2295
```

```
Xaa Xaa  Xaa Xaa Xaa Xaa Xaa  Xaa Xaa Xaa Xaa Cys  Xaa Xaa Xaa
    2300                 2305                 2310

Xaa Xaa  Cys Xaa Xaa Xaa Xaa  Xaa Xaa Xaa Xaa Xaa  Xaa Xaa Xaa
    2315                 2320                 2325

Xaa Xaa  Xaa Xaa Xaa Xaa Xaa  Xaa Xaa Xaa Xaa Xaa  Xaa Xaa Xaa
    2330                 2335                 2340

Xaa Xaa  Xaa Xaa Xaa Xaa Xaa  Xaa Xaa Xaa Xaa Xaa  Xaa Xaa Xaa
    2345                 2350                 2355

Xaa Xaa  Xaa Xaa Xaa Xaa Xaa  Xaa Cys Xaa Xaa Xaa  Xaa Xaa Xaa
    2360                 2365                 2370

Xaa Xaa  Xaa Xaa Xaa Xaa Xaa  Xaa Xaa Xaa Xaa Xaa  Xaa Xaa Xaa
    2375                 2380                 2385

Xaa Xaa  Xaa Xaa Xaa Xaa Xaa  Xaa Xaa Xaa Xaa Xaa  Xaa Xaa Xaa
    2390                 2395                 2400

Xaa Xaa  Xaa Xaa Xaa Xaa Xaa  Xaa Xaa Xaa Xaa Xaa  Xaa Xaa Xaa
    2405                 2410                 2415

Xaa Xaa  Xaa Xaa Xaa Xaa Xaa  Xaa Xaa Xaa Xaa Xaa  Xaa Xaa Xaa
    2420                 2425                 2430

Xaa Xaa  Xaa Xaa Xaa Xaa Xaa  Xaa Xaa Xaa Xaa Xaa  Xaa Xaa Xaa
    2435                 2440                 2445

Xaa Xaa  Xaa Xaa Xaa Xaa Xaa  Xaa Xaa Xaa Xaa Xaa  Xaa Xaa Xaa
    2450                 2455                 2460

Xaa Xaa  Xaa Xaa Xaa Xaa Xaa  Xaa Xaa Xaa Xaa Xaa  Xaa Xaa Xaa
    2465                 2470                 2475

Xaa Xaa  Xaa Xaa Xaa Xaa Xaa  Xaa Xaa Xaa Xaa Xaa  Xaa Xaa Xaa
    2480                 2485                 2490

Xaa Xaa  Xaa Xaa Xaa Xaa Xaa  Xaa Xaa Xaa Xaa Xaa  Xaa Xaa Xaa
    2495                 2500                 2505

Xaa Xaa  Xaa Xaa Xaa Xaa Xaa  Xaa Xaa Xaa Xaa Xaa  Xaa Xaa Xaa
    2510                 2515                 2520

Xaa Xaa  Xaa Xaa Xaa Xaa Xaa  Xaa Xaa Xaa Xaa Xaa  Xaa Xaa Xaa
    2525                 2530                 2535

Xaa Xaa  Xaa Xaa Xaa Xaa Xaa  Xaa Xaa Xaa Xaa Xaa  Xaa Xaa Xaa
    2540                 2545                 2550

Xaa Xaa  Xaa Xaa Xaa Xaa Xaa  Xaa Xaa Xaa Xaa Xaa  Xaa Xaa Xaa
    2555                 2560                 2565

Xaa Xaa  Xaa Xaa Xaa Xaa Xaa  Xaa Xaa Xaa Xaa Xaa  Xaa Xaa Xaa
    2570                 2575                 2580

Xaa Xaa  Xaa Xaa Xaa Xaa Xaa  Xaa Xaa Xaa Xaa Xaa  Xaa Xaa Xaa
    2585                 2590                 2595

Xaa Xaa  Xaa Xaa Xaa Xaa Xaa  Xaa Xaa Xaa Xaa Xaa  Xaa Xaa Xaa
    2600                 2605                 2610

Xaa Xaa  Xaa Xaa Xaa Xaa Xaa  Xaa Xaa Xaa Xaa Xaa  Xaa Xaa Xaa
    2615                 2620                 2625

Xaa Xaa  Xaa Xaa Xaa Xaa Xaa  Xaa Xaa Xaa Xaa Xaa  Xaa Xaa Xaa
    2630                 2635                 2640

Xaa Xaa  Xaa Xaa Xaa Xaa Xaa  Xaa Xaa Xaa Xaa Xaa  Xaa Xaa Xaa
    2645                 2650                 2655

Xaa Xaa  Xaa Xaa Xaa Xaa Xaa  Xaa Xaa Xaa Xaa Xaa  Xaa Xaa Xaa
    2660                 2665                 2670

Xaa Xaa  Xaa Xaa Xaa Xaa Xaa  Xaa Xaa Xaa Xaa Xaa  Xaa Xaa Xaa
    2675                 2680                 2685

Xaa Xaa  Xaa Xaa Xaa Xaa Xaa  Xaa Xaa Xaa Xaa Xaa  Xaa Xaa Xaa
```

-continued

```
    2690                2695                2700

Xaa Xaa  Xaa Xaa Xaa Xaa Xaa  Xaa Xaa Xaa Xaa Xaa  Xaa Xaa Xaa
    2705                2710                2715

Xaa Xaa  Xaa Xaa Xaa Xaa Xaa  Xaa Xaa Xaa Xaa Xaa  Xaa Xaa Xaa
    2720                2725                2730

Xaa Xaa  Xaa Xaa Xaa Xaa Xaa  Xaa Xaa Xaa Xaa Xaa  Xaa Xaa Xaa
    2735                2740                2745

Xaa Xaa  Xaa Xaa Xaa Xaa Xaa  Xaa Xaa Xaa Xaa Xaa  Xaa Xaa Xaa
    2750                2755                2760

Xaa Xaa  Xaa Xaa Xaa Xaa Xaa  Xaa Xaa Xaa Xaa Xaa  Xaa Xaa Xaa
    2765                2770                2775

Xaa Xaa  Xaa Xaa Xaa Xaa Xaa  Xaa Xaa Xaa Xaa Xaa  Xaa Xaa Xaa
    2780                2785                2790

Xaa Xaa  Xaa Xaa Xaa Xaa Xaa  Xaa Xaa Xaa Xaa Xaa  Xaa Xaa Xaa
    2795                2800                2805

Xaa Xaa  Xaa Xaa Xaa Xaa Xaa  Xaa Xaa Xaa Xaa Xaa  Xaa Xaa Xaa
    2810                2815                2820

Xaa Xaa  Xaa Xaa Xaa Xaa Xaa  Xaa Xaa Xaa Xaa Xaa  Xaa Xaa Xaa
    2825                2830                2835

Xaa Xaa  Xaa Xaa Xaa Xaa Xaa  Xaa Xaa Xaa Xaa Xaa  Xaa Xaa Xaa
    2840                2845                2850

Xaa Xaa  Xaa Xaa Xaa Xaa Xaa  Xaa Xaa Xaa Xaa Xaa  Xaa Xaa Xaa
    2855                2860                2865

Xaa Xaa  Xaa Xaa Xaa Xaa Xaa  Xaa Xaa Xaa Xaa Xaa  Xaa Xaa Xaa
    2870                2875                2880

Xaa Xaa  Xaa Xaa Xaa Xaa Xaa  Xaa Xaa Xaa Xaa Xaa  Xaa Xaa Xaa
    2885                2890                2895

Xaa Xaa  Xaa Xaa Xaa Xaa Xaa  Xaa Xaa Xaa Xaa Xaa  Xaa Xaa Xaa
    2900                2905                2910

Xaa Xaa  Xaa Xaa Xaa Xaa Xaa  Xaa Xaa Xaa Xaa Xaa  Xaa Xaa Xaa
    2915                2920                2925

Xaa Xaa  Xaa Xaa Xaa Xaa Xaa  Xaa Xaa Xaa Xaa Xaa  Xaa Xaa Xaa
    2930                2935                2940

Xaa Xaa  Xaa Xaa Xaa Xaa Xaa  Xaa Xaa Xaa Xaa Xaa  Xaa Xaa Xaa
    2945                2950                2955

Xaa Xaa  Xaa Xaa Xaa Xaa Xaa  Xaa Xaa Xaa Xaa Xaa  Xaa Xaa Xaa
    2960                2965                2970

Xaa Xaa  Xaa Xaa Xaa Xaa Xaa  Xaa Xaa Xaa Xaa Xaa  Xaa Xaa Xaa
    2975                2980                2985

Xaa Xaa  Xaa Xaa Xaa Xaa Xaa  Xaa Xaa Xaa Xaa Xaa  Xaa Xaa Xaa
    2990                2995                3000

Xaa Xaa  Xaa Xaa Xaa Xaa Xaa  Xaa Xaa Xaa Xaa Xaa  Xaa Xaa Xaa
    3005                3010                3015

Xaa Xaa  Xaa Xaa Xaa Xaa Xaa  Xaa Xaa Xaa Xaa Xaa  Xaa Xaa Xaa
    3020                3025                3030

Xaa Xaa  Xaa Xaa Xaa Xaa Xaa  Xaa Xaa Xaa Xaa Xaa  Xaa Xaa Xaa
    3035                3040                3045

Xaa Xaa  Xaa Xaa Xaa Xaa Xaa  Xaa Xaa Xaa Xaa Xaa  Xaa Xaa Xaa
    3050                3055                3060

Xaa Xaa  Xaa Xaa Xaa Xaa Xaa  Xaa Xaa Xaa Xaa Xaa  Xaa Xaa Xaa
    3065                3070                3075

Xaa Xaa  Xaa Xaa Xaa Xaa Xaa  Xaa Xaa Xaa Xaa Xaa  Xaa Xaa Xaa
    3080                3085                3090
```

-continued

```
Xaa Xaa  Xaa Xaa Xaa Xaa Xaa  Xaa Xaa Xaa Xaa Xaa  Xaa Xaa Xaa
    3095                 3100                 3105

Xaa Xaa  Xaa Xaa Xaa Xaa Xaa  Xaa Xaa Xaa Xaa Xaa  Xaa Xaa Xaa
    3110                 3115                 3120

Xaa Xaa  Xaa Xaa Xaa Xaa Xaa  Xaa Xaa Xaa Xaa Xaa  Xaa Xaa Xaa
    3125                 3130                 3135

Xaa Xaa  Xaa Xaa Xaa Xaa Xaa  Xaa Xaa Xaa Xaa Xaa  Xaa Xaa Xaa
    3140                 3145                 3150

Xaa Xaa  Xaa Xaa Xaa Xaa Xaa  Xaa Xaa Xaa Xaa Xaa  Xaa Xaa Xaa
    3155                 3160                 3165

Xaa Xaa  Xaa Xaa Xaa Xaa Xaa  Xaa Xaa Xaa Xaa Xaa  Xaa Xaa Xaa
    3170                 3175                 3180

Xaa Xaa  Xaa Xaa Xaa Xaa Xaa  Xaa Xaa Xaa Xaa Xaa  Xaa Xaa Xaa
    3185                 3190                 3195

Xaa Xaa  Xaa Xaa Xaa Xaa Xaa  Xaa Xaa Xaa Xaa Xaa  Xaa Xaa Xaa
    3200                 3205                 3210

Xaa Xaa  Xaa Xaa Xaa Xaa Xaa  Xaa Xaa Xaa Xaa Xaa  Xaa Xaa Xaa
    3215                 3220                 3225

Xaa Xaa  Xaa Xaa Xaa Xaa Xaa  Xaa Xaa Xaa Xaa Xaa  Xaa Xaa Xaa
    3230                 3235                 3240

Xaa Xaa  Xaa Xaa Xaa Xaa Xaa  Xaa Xaa Xaa Xaa Xaa  Xaa Xaa Xaa
    3245                 3250                 3255

Xaa Xaa  Xaa Xaa Xaa Xaa Xaa  Xaa Xaa Xaa Xaa Xaa  Xaa Xaa Xaa
    3260                 3265                 3270

Xaa Xaa  Xaa Xaa Xaa Xaa Xaa  Xaa Xaa Xaa Xaa Xaa  Xaa Xaa Xaa
    3275                 3280                 3285

Xaa Xaa  Xaa Xaa Xaa Xaa Xaa  Xaa Xaa Xaa Xaa Xaa  Xaa Xaa Xaa
    3290                 3295                 3300

Xaa Xaa  Xaa Xaa Xaa Xaa Xaa  Xaa Xaa Xaa Xaa Xaa  Xaa Xaa Xaa
    3305                 3310                 3315

Xaa Xaa  Xaa Xaa Xaa Xaa Xaa  Xaa Xaa Xaa Xaa Xaa  Xaa Xaa Xaa
    3320                 3325                 3330

Xaa Xaa  Xaa Xaa Xaa Xaa Xaa  Xaa Xaa Xaa Xaa Xaa  Xaa Xaa Xaa
    3335                 3340                 3345

Xaa Xaa  Xaa Xaa Xaa Xaa Xaa  Xaa Xaa Xaa Xaa Xaa  Xaa Xaa Xaa
    3350                 3355                 3360

Xaa Xaa  Xaa Xaa Xaa Xaa Xaa  Xaa Xaa Xaa Xaa Xaa  Xaa Xaa Xaa
    3365                 3370                 3375

Xaa Xaa  Xaa Xaa Xaa Xaa Xaa  Xaa Xaa Xaa Xaa Xaa  Xaa Xaa Xaa
    3380                 3385                 3390

Xaa Xaa  Xaa Xaa Xaa Xaa Xaa  Xaa Xaa Xaa Xaa Xaa  Xaa Xaa Xaa
    3395                 3400                 3405

Xaa Xaa  Xaa Xaa Xaa Xaa Xaa  Xaa Xaa Xaa Xaa Xaa  Xaa Xaa Xaa
    3410                 3415                 3420

Xaa Xaa  Xaa Xaa Xaa Xaa Xaa  Xaa Xaa Xaa Xaa Xaa  Xaa Xaa Xaa
    3425                 3430                 3435

Xaa Xaa  Xaa Xaa Xaa Xaa Xaa  Xaa Xaa Xaa Xaa Xaa  Xaa Xaa Xaa
    3440                 3445                 3450

Xaa Xaa  Xaa Xaa Xaa Xaa Xaa  Xaa Xaa Xaa Xaa Xaa  Xaa Xaa Xaa
    3455                 3460                 3465

Xaa Xaa  Xaa Xaa Xaa Xaa Xaa  Xaa Xaa Xaa Xaa Xaa  Xaa Xaa Xaa
    3470                 3475                 3480

Xaa Xaa  Xaa Xaa Xaa Xaa Xaa  Xaa Xaa Xaa Xaa Xaa  Xaa Xaa Xaa
    3485                 3490                 3495
```

-continued

```
Xaa Xaa  Xaa Xaa Xaa Xaa Xaa  Xaa Xaa Xaa Xaa Xaa  Xaa Xaa Xaa
    3500                 3505                 3510

Xaa Xaa  Xaa Xaa Xaa Xaa Xaa  Xaa Xaa Xaa Xaa Xaa  Xaa Xaa Xaa
    3515                 3520                 3525

Xaa Xaa  Xaa Xaa Xaa Xaa Xaa  Xaa Xaa Xaa Xaa Xaa  Xaa Xaa Xaa
    3530                 3535                 3540

Xaa Xaa  Xaa Xaa Xaa Xaa Xaa  Xaa Xaa Xaa Xaa Xaa  Xaa Xaa Xaa
    3545                 3550                 3555

Xaa Xaa  Xaa Xaa Xaa Xaa Xaa  Xaa Xaa Xaa Xaa Xaa  Xaa Xaa Xaa
    3560                 3565                 3570

Xaa Xaa  Xaa Xaa Xaa Xaa Xaa  Xaa Xaa Xaa Xaa Xaa  Xaa Xaa Xaa
    3575                 3580                 3585

Xaa Xaa  Xaa Xaa Xaa Xaa Xaa  Xaa Xaa Xaa Xaa Xaa  Xaa Xaa Xaa
    3590                 3595                 3600

Xaa Xaa  Xaa Xaa Xaa Xaa Xaa  Xaa Xaa Xaa Xaa Xaa  Xaa Xaa Xaa
    3605                 3610                 3615

Xaa Xaa  Xaa Xaa Xaa Xaa Xaa  Xaa Xaa Xaa Xaa Xaa  Xaa Xaa Xaa
    3620                 3625                 3630

Xaa Xaa  Xaa Xaa Xaa Xaa Xaa  Xaa Xaa Xaa Xaa Xaa  Xaa Xaa Xaa
    3635                 3640                 3645

Xaa Xaa  Xaa Xaa Xaa Xaa Xaa  Xaa Xaa Xaa Xaa Xaa  Xaa Xaa Xaa
    3650                 3655                 3660

Xaa Xaa  Xaa Xaa Xaa Xaa Xaa  Xaa Xaa Xaa Xaa Xaa  Xaa Xaa Xaa
    3665                 3670                 3675

Xaa Xaa  Xaa Xaa Xaa Xaa Xaa  Xaa Xaa Xaa Xaa Xaa  Xaa Xaa Xaa
    3680                 3685                 3690

Xaa Xaa  Xaa Xaa Xaa Xaa Xaa  Xaa Xaa Xaa Xaa Xaa  Xaa Xaa Xaa
    3695                 3700                 3705

Xaa Xaa  Xaa Xaa Xaa Xaa Xaa  Xaa Xaa Xaa Xaa Xaa  Xaa Xaa Xaa
    3710                 3715                 3720

Xaa Xaa  Xaa Xaa Xaa Xaa Xaa  Xaa Xaa Xaa Xaa Xaa  Xaa Xaa Xaa
    3725                 3730                 3735

Xaa Xaa  Xaa Xaa Xaa Xaa Xaa  Xaa Xaa Xaa Xaa Xaa  Xaa Xaa Xaa
    3740                 3745                 3750

Xaa Xaa  Xaa Xaa Xaa Xaa Xaa  Xaa Xaa Xaa Xaa Xaa  Xaa Xaa Xaa
    3755                 3760                 3765

Xaa Xaa  Xaa Xaa Xaa Xaa Xaa  Xaa Xaa Xaa Xaa Xaa  Xaa Xaa Xaa
    3770                 3775                 3780

Xaa Xaa  Xaa Xaa Xaa Xaa Xaa  Xaa Xaa Xaa Xaa Xaa  Xaa Xaa Xaa
    3785                 3790                 3795

Xaa Xaa  Xaa Xaa Xaa Xaa Xaa  Xaa Xaa Xaa Xaa Xaa  Xaa Xaa Xaa
    3800                 3805                 3810

Xaa Xaa  Xaa Xaa Xaa Xaa Xaa  Xaa Xaa Xaa Xaa Xaa  Xaa Xaa Xaa
    3815                 3820                 3825

Xaa Xaa  Xaa Xaa Xaa Xaa Xaa  Xaa Xaa Xaa Xaa Xaa  Xaa Xaa Xaa
    3830                 3835                 3840

Xaa Xaa  Xaa Xaa Xaa Xaa Xaa  Xaa Xaa Xaa Xaa Xaa  Xaa Xaa Xaa
    3845                 3850                 3855

Xaa Xaa  Xaa Xaa Xaa Xaa Xaa  Xaa Xaa Xaa Xaa Xaa  Xaa Xaa Xaa
    3860                 3865                 3870

Xaa Xaa  Xaa Xaa Xaa Xaa Xaa  Xaa Xaa Xaa Xaa Xaa  Xaa Xaa Xaa
    3875                 3880                 3885

Xaa Xaa  Xaa Xaa Xaa Xaa Xaa  Xaa Xaa Xaa Xaa Xaa  Xaa Xaa Xaa
```

-continued

```
    3890                3895                3900

Xaa Xaa  Xaa Xaa Xaa Xaa Xaa  Xaa Xaa Xaa Xaa Xaa  Xaa Xaa Xaa
    3905                3910                3915

Xaa Xaa  Xaa Xaa Xaa Xaa Xaa  Xaa Xaa Xaa Xaa Xaa  Xaa Xaa Xaa
    3920                3925                3930

Xaa Xaa  Xaa Xaa Xaa Xaa Xaa  Xaa Xaa Xaa Xaa Xaa  Xaa Xaa Xaa
    3935                3940                3945

Xaa Xaa  Xaa Xaa Xaa Xaa Xaa  Xaa Xaa Xaa Xaa Xaa  Xaa Xaa Xaa
    3950                3955                3960

Xaa Xaa  Xaa Xaa Xaa Xaa Xaa  Xaa Xaa Xaa Xaa Xaa  Xaa Xaa Xaa
    3965                3970                3975

Xaa Xaa  Xaa Xaa Xaa Xaa Xaa  Xaa Xaa Xaa Xaa Xaa  Xaa Xaa Xaa
    3980                3985                3990

Xaa Xaa  Xaa Xaa Xaa Xaa Xaa  Xaa Xaa Xaa Xaa Xaa  Xaa Xaa Xaa
    3995                4000                4005

Xaa Xaa  Xaa Xaa Xaa Xaa Xaa  Xaa Xaa Xaa Xaa Xaa  Xaa Xaa Xaa
    4010                4015                4020

Xaa Xaa  Xaa Xaa Xaa Xaa Xaa  Xaa Xaa Xaa Xaa Xaa  Xaa Xaa Xaa
    4025                4030                4035

Xaa Xaa  Xaa Xaa Xaa Xaa Xaa  Xaa Xaa Xaa Xaa Xaa  Xaa Xaa Xaa
    4040                4045                4050

Xaa Xaa  Xaa Xaa Xaa Xaa Xaa  Xaa Xaa Xaa Xaa Xaa  Xaa Xaa Xaa
    4055                4060                4065

Xaa Xaa  Xaa Xaa Xaa Xaa Xaa  Xaa Xaa Xaa Xaa Xaa  Xaa Xaa Xaa
    4070                4075                4080

Xaa Xaa  Xaa Xaa Xaa Xaa Xaa  Xaa Xaa Xaa Xaa Xaa  Xaa Xaa Xaa
    4085                4090                4095

Xaa Xaa  Xaa Xaa Xaa Xaa Xaa  Xaa Xaa Xaa Xaa Xaa  Xaa Xaa Xaa
    4100                4105                4110

Xaa Xaa  Xaa Xaa Xaa Xaa Xaa  Xaa Xaa Xaa Xaa Xaa  Xaa Xaa Xaa
    4115                4120                4125

Xaa Xaa  Xaa Xaa Xaa Xaa Xaa  Xaa Xaa Xaa Xaa Xaa  Xaa Xaa Xaa
    4130                4135                4140

Xaa Xaa  Xaa Xaa Xaa Xaa Xaa  Xaa Xaa Xaa Xaa Xaa  Xaa Xaa Xaa
    4145                4150                4155

Xaa Xaa  Xaa Xaa Xaa Xaa Xaa  Xaa Xaa Xaa Xaa Xaa  Xaa Xaa Xaa
    4160                4165                4170

Xaa Xaa  Xaa Xaa Xaa Xaa Xaa  Xaa Xaa Xaa Xaa Xaa  Xaa Xaa Xaa
    4175                4180                4185

Xaa Xaa  Xaa Xaa Xaa Xaa Xaa  Xaa Xaa Xaa Xaa Xaa  Xaa Xaa Xaa
    4190                4195                4200

Xaa Xaa  Xaa Xaa Xaa Xaa Xaa  Xaa Xaa Xaa Xaa Xaa  Xaa Xaa Xaa
    4205                4210                4215

Xaa Xaa  Xaa Xaa Xaa Xaa Xaa  Xaa Xaa Xaa Xaa Xaa  Xaa Xaa Xaa
    4220                4225                4230

Xaa Xaa  Xaa Xaa Xaa Xaa Xaa  Xaa Xaa Xaa Xaa Xaa  Xaa Xaa Xaa
    4235                4240                4245

Xaa Xaa  Xaa Xaa Xaa Xaa Xaa  Xaa Xaa Xaa Xaa Xaa  Xaa Xaa Xaa
    4250                4255                4260

Xaa Xaa  Xaa Xaa Xaa Xaa Xaa  Xaa Xaa Xaa Xaa Xaa  Xaa Xaa Xaa
    4265                4270                4275

Xaa Xaa  Xaa Xaa Xaa Xaa Xaa  Xaa Xaa Xaa Xaa Xaa  Xaa Xaa Xaa
    4280                4285                4290
```

-continued

```
Xaa Xaa  Xaa Xaa Xaa Xaa Xaa  Xaa Xaa Xaa Xaa Xaa  Xaa Xaa Xaa
    4295                 4300                 4305

Xaa Xaa  Xaa Xaa Xaa Xaa Xaa  Xaa Xaa Xaa Xaa Xaa  Xaa Xaa Xaa
    4310                 4315                 4320

Xaa Xaa  Xaa Xaa Xaa Xaa Xaa  Xaa Xaa Xaa Xaa Xaa  Xaa Xaa Xaa
    4325                 4330                 4335

Xaa Xaa  Xaa Xaa Xaa Xaa Xaa  Xaa Xaa Xaa Xaa Xaa  Xaa Xaa Xaa
    4340                 4345                 4350

Xaa Xaa  Xaa Xaa Xaa Xaa Xaa  Xaa Xaa Xaa Xaa Xaa  Xaa Xaa
    4355                 4360                 4365
```